US008147309B2

(12) United States Patent
Amirsadri et al.

(10) Patent No.: US 8,147,309 B2
(45) Date of Patent: Apr. 3, 2012

(54) SYSTEM AND METHOD FOR PROVIDING A TABLE POKER WAGERING GAME

(75) Inventors: Amir Amirsadri, East Greenwich, RI (US); Richard Finocchio, Everett, MA (US); Thomas Napolitano, East Greenwich, RI (US); Thomas K. Oram, Hudson, MA (US); Brian J. Roberts, Belmont, NC (US)

(73) Assignee: GTech Rhode Island Corporation, West Greenwich, RI (US)

(*) Notice: Subject to any disclaimer, the term of this patent is extended or adjusted under 35 U.S.C. 154(b) by 1035 days.

(21) Appl. No.: 11/503,351

(22) Filed: Aug. 10, 2006

(65) Prior Publication Data

US 2008/0045287 A1 Feb. 21, 2008

(51) Int. Cl.
*A63F 9/24* (2006.01)
*A63F 13/00* (2006.01)

(52) U.S. Cl. ................. 463/13; 463/25; 463/29; 463/42

(58) Field of Classification Search .................. 273/274, 273/292; 463/13, 24, 29, 42, 25
See application file for complete search history.

(56) References Cited

U.S. PATENT DOCUMENTS 4,033,588 A 7/1977 Watts
5,100,139 A 3/1992 Di Bella
5,239,165 A 8/1993 Novak
5,317,135 A 5/1994 Finocchio
5,664,781 A 9/1997 Feola (Continued)

FOREIGN PATENT DOCUMENTS

WO WO 2006/102633 9/2006

OTHER PUBLICATIONS

International Search Report dated Feb. 18, 2008, International Application No. PCT/US2007/017836 filed Aug. 10, 2007.

(Continued)

*Primary Examiner* — Dmitry Suhol
*Assistant Examiner* — Ryan Hsu
(74) *Attorney, Agent, or Firm* — Sullivan & Worcester LLP; Christopher T. McWhinney

(57) ABSTRACT

A system and method for facilitating play of a game of chance by multiple players at multiple locations using a virtual card deck are provided. The system may include a plurality of terminals at the multiple locations, the terminals receiving wagers from the plurality of players, the plurality of terminals issuing tickets to the plurality of players. Each ticket may include a respective player hand chosen from the virtual card deck and an identification code uniquely identifying the ticket. The system may include a plurality of displays at the multiple locations, the displays displaying a shared community hand chosen from the virtual card deck. The system may include a server in communication with the plurality of terminals and the plurality of displays. The server may select a set of removed cards from the virtual card deck prior to issuing tickets for the game. The server may receive an indication of each player's wager from a terminal and responsively providing a respective unique identification number and a respective player hand for inclusion on the ticket delivered to the player, each player hand chosen from the virtual card deck but not from the set of removed cards. The server may select the shared community hand from the set of removed cards and communicating the shared community hand to the plurality of displays for display. The server may determine if a ticket is a winning ticket in accordance with predetermined game rules, based on the player hand included on the ticket and the shared community hand.

30 Claims, 16 Drawing Sheets

U.S. PATENT DOCUMENTS 5,772,510 A 6/1998 Roberts
5,810,011 A 9/1998 Kunig
5,839,731 A 11/1998 Feola
5,851,011 A 12/1998 Lott
5,868,392 A * 2/1999 Kraft .......... 273/292
5,871,398 A * 2/1999 Schneier et al. .......... 463/16
6,132,311 A 10/2000 Williams
6,149,156 A 11/2000 Feola
6,210,276 B1 4/2001 Mullins
6,357,749 B1 3/2002 Feola
6,364,313 B1 4/2002 Moody
6,368,219 B1 4/2002 Szrek et al.
6,382,629 B1 5/2002 Hill
6,454,266 B1 9/2002 Breeding et al.
6,457,714 B1 10/2002 Feola
6,467,771 B1 10/2002 deKeller
6,478,676 B1 11/2002 Dayan
6,572,107 B1 6/2003 Walker et al.
6,637,746 B1 10/2003 Baranauskas
6,676,515 B1 * 1/2004 Baltz et al. .......... 463/25
6,679,777 B2 * 1/2004 Pfeiffer et al. .......... 463/42
6,726,077 B2 4/2004 Roberts et al.
6,755,739 B2 6/2004 Santini, Jr.
6,886,728 B2 5/2005 Roberts et al.
6,899,622 B2 5/2005 Lind et al.
6,929,544 B2 8/2005 Osterer
6,932,258 B1 8/2005 Roberts et al.
6,986,514 B2 1/2006 Snow
7,011,381 B2 3/2006 Roberts et al.
7,032,793 B2 4/2006 Roberts et al.
7,070,505 B2 * 7/2006 Vancura et al. .......... 463/25
7,306,521 B2 * 12/2007 Toyoda .......... 463/20
2001/0006181 A1 7/2001 Roberts et al.
2001/0034263 A1 10/2001 Roberts
2001/0048013 A1 12/2001 Roberts et al.
2001/0049986 A1 12/2001 Roberts et al.
2002/0098882 A1 7/2002 Lind et al.
2002/0128059 A1 * 9/2002 Baltz et al. .......... 463/25
2003/0027638 A1 2/2003 Schneider et al.
2003/0032479 A1 * 2/2003 LeMay et al. .......... 463/32
2003/0130023 A1 * 7/2003 Angel .......... 463/13
2003/0228910 A1 12/2003 Jawaharlal et al.
2004/0176154 A1 * 9/2004 Finnochio .......... 463/3
2004/0204215 A1 10/2004 Meehan et al.
2004/0229677 A1 * 11/2004 Gray et al. .......... 463/17
2005/0090304 A1 4/2005 Crawford et al.
2005/0092839 A1 5/2005 Oram
2005/0107148 A1 5/2005 Webb
2005/0107153 A1 5/2005 Jubinville et al.
2005/0116416 A1 * 6/2005 Peterson .......... 273/292
2005/0167921 A1 * 8/2005 Finocchio .......... 273/292
2005/0167922 A1 8/2005 Finocchio
2005/0173862 A1 8/2005 Orenstein
2005/0181858 A1 8/2005 Caro et al.
2005/0242505 A1 11/2005 Reiner et al.
2005/0250569 A1 11/2005 Kane et al.
2005/0250576 A1 11/2005 Kane et al.
2005/0280210 A1 12/2005 Harrison
2005/0282605 A1 12/2005 Englman et al.
2006/0009274 A1 1/2006 Finocchio
2006/0025198 A1 * 2/2006 Gail et al. .......... 463/19
2006/0025213 A1 2/2006 Kane et al.
2006/0035698 A1 2/2006 Roberts et al.
2006/0040726 A1 2/2006 Szrek et al.
2006/0043669 A1 3/2006 Gumina
2006/0044110 A1 3/2006 Napolitano
2006/0058088 A1 * 3/2006 Crawford et al. .......... 463/13
2006/0066052 A1 3/2006 White et al.
2006/0068869 A1 * 3/2006 White et al. .......... 463/13
2006/0071046 A1 4/2006 Roberts et al.
2006/0081674 A1 4/2006 Roberts et al.
2006/0111167 A1 5/2006 Breslo
2006/0197283 A1 * 9/2006 Thinnes .......... 273/269
2006/0214375 A1 9/2006 Wonpu
2006/0217167 A1 * 9/2006 Jubinville et al. .......... 463/13
2007/0145684 A1 * 6/2007 Webb et al. .......... 273/292

OTHER PUBLICATIONS http://www.bclc.com/cm/HowToPlay/Lottery/PacificHoldEmPoker.htm, (downloaded Apr. 28, 2009).

* cited by examiner 700 702 704 706 708 710'

| Hand | Beat 1 Player | Beat 2 Players | Beat 3 Players |
|---|---|---|---|
| Royal Flush | | | $5,000 |
| Straight Flush | | $100 | $500 |
| 4 of a Kind | $50 | $75 | $100 |
| Full House | $10 | $20 | $30 |
| Flush | $7 | $8 | $15 |
| Straight | $5 | $6 | $9 |
| 3 of a Kind | $3 | $4 | $6 |
| 2 Pairs | $2 | $3 | $4 |
| 1 Pair | $1 | $2 | $3 |
| High Card | | $1 | $3 |

FIG. 7

FIG. 8A

800

| Ticket ID | Time of Purchase | Rounds | Cards | Place Sold | Auth Code | Rules Selected | Time Redeemed | Prize Awarded |
|---|---|---|---|---|---|---|---|---|
| 1 | 3/20/06 8:40pm | 2, 3, 4 | ... | 6301 | 690 | Win 3 | 3/28 9:03pm | $100 |
| 2 | 3/20/06 8:45pm | 2 | ... | 1820 | 988 | Win 2 | | |
| 3 | 3/20/06 8:48pm | 2 | ... | 1285 | 3859 | Win 1 | | |
| 4 | 3/20/06 8:50pm | 3, 4, 5 | ... | 1174 | 7690 | Win 1 | 4/3/06 12:15pm | $50 |
| 5 | 3/20/06 8:56pm | 5, 6 | ... | 3059 | 1679 | Win 2 | 3/31/06 3:25pm | $10 |

802 802 802 802 802

FIG. 8B

| 804 | 806 | 808 | 810 | 812 | 814 | 816 | 818 | 820 |
|---|---|---|---|---|---|---|---|---|
| 4 | 3/20/06 8:50pm | 3, 4, 5 | ... | 1612 | 3910 | Win 1 | 4/3/06 12:15pm | $50 |

802

FIG. 9A

900

| Round ID | Open Time | Close Time | Draw Time | Cards Pulled | Community Cards | Opponent 1 Cards | Opponent 2 Cards | Burn Cards |
|---|---|---|---|---|---|---|---|---|
| 101 | 4/5/06 9:00am | 4/5/06 9:10am | 4/5/06 8:59am | ... | ... | ... | ... | ... |
| 102 | 4/5/06 9:10am | 4/5/06 9:20am | 4/5/06 9:09am | ... | ... | ... | ... | ... |
| 103 | 4/5/06 9:20am | 4/5/06 9:30am | 4/5/06 9:19am | ... | ... | ... | ... | ... |
| 104 | 4/5/06 9:30am | 4/5/06 9:40am | 4/5/06 9:29am | ... | ... | ... | ... | ... |
| 105 | 4/5/06 9:40am | 4/5/06 9:50am | 4/5/06 9:39am | ... | ... | ... | ... | ... |

902 (each row)

FIG. 9B

| 904 | 906 | 908 | 910 | 912 | 914 | 916 | 918 | 920 |
|---|---|---|---|---|---|---|---|---|
| 101 | 4/5/06 9:00am | 4/5/06 9:10am | 4/5/06 8:59am | ... | ... | ... | ... | ... |

902

SYSTEM AND METHOD FOR PROVIDING A TABLE POKER WAGERING GAME

BACKGROUND

Texas hold'em is a community card poker game and one of the most popular poker variants played in casinos in the United States. In a casino, Texas hold'em poker is generally played with between 2 and 10 people.

Play begins with each player being dealt two cards face down. These cards are the player's hole or pocket cards. These are the only cards each player will receive individually. A series of betting and dealing ensures, with players betting, calling, raising, or folding. A total of five community cards are dealt face up.

After the final community card is dealt, players reveal their cards in a showdown. Each player attempts to form his best five card poker hand from his two hole cards and the five community cards. The player with the best five card hand wins the draw. Poker hands are ranked in accordance to predetermined rules.

A variety of other community card poker games are also available, such as Omaha. Variations are also available, such as Omaha High-Low.

Monitor games are games played in social establishments where players wager on the outcome of a random drawing. Drawings typically occur periodically, such as every five minutes. Players participate by purchasing a ticket that specifies the player's symbols for a draw. The symbols may be a series of numbers from one to eighty. Winning symbols are randomly drawn at a central location and displayed on TV monitors visible to the players during a draw.

If the player's symbols match the winning symbols in accordance with predetermined rules, the player may win an award. The predetermined rules may vary the player's award depending on how many symbols were matched, a selected wagering option, a wager amount, or other factors

BRIEF DESCRIPTION OF THE DRAWINGS

FIG. 7 illustrates an example embodiment of a prize table, according to an example embodiment of the present invention.

FIG. 8A illustrates an example embodiment of a ticket records, according to an example embodiment of the present invention.

FIG. 8B illustrates an example embodiment of a ticket records entry, according to an example embodiment of the present invention.

FIG. 9A illustrates an example embodiment of a draw records, according to an example embodiment of the present invention.

FIG. 9B illustrates an example embodiment of a draw records entry, according to an example embodiment of the present invention.

DETAILED DESCRIPTION OF EXAMPLE EMBODIMENTS

Figure 1A:
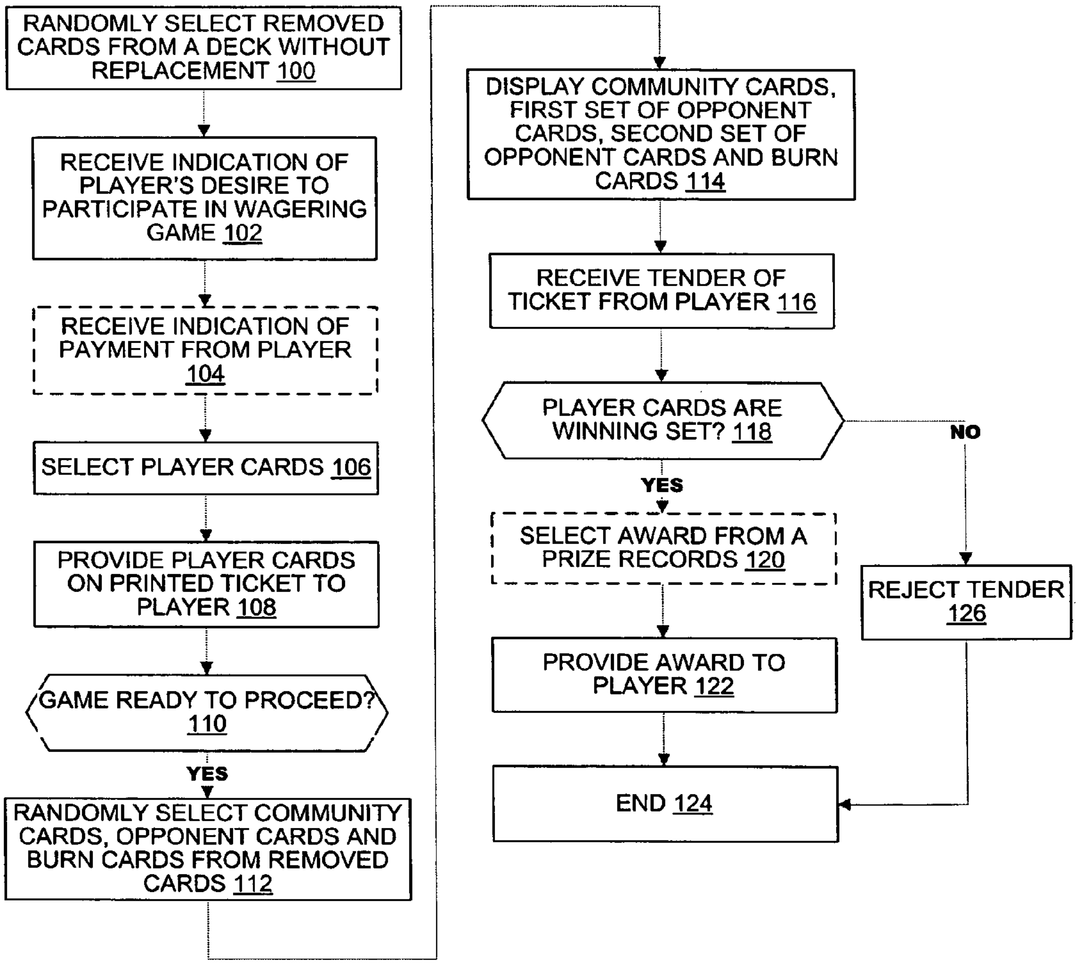
FIG. 1A illustrates a first example procedure for conducting a wagering game, in accordance with a first example embodiment of the present invention.

A method and system for conducting a wagering game are provided as example embodiments of the present invention. The wagering game may be a Texas Hold'Em themed monitor game conducted at a plurality of premises, although it will be appreciated that other types of card games may be simulated. For example, premises may be social establishments including casinos, bars, restaurants, lounges, or any other location where players and potential players congregate. Each premise may include a terminal to dispense tickets and a display. The wagering game may be conducted from a server located in a central location, the server in communication with each terminal and display. Game results may be broadcasted from the server to each display in real-time over a secure network.

The wagering game may include a player receiving two player cards after a draw begins. For example, the player may purchase a ticket dispensed from a terminal, wherein the ticket displays the two player cards. When the draw closes, community cards and opponent cards may be displayed on the display, the display viewable by the player. The player may compare his player cards to the community cards and opponent cards to determine if he holds winning cards in accordance with predetermined rules. The player may redeem a ticket with winning cards for his award.

One example embodiment of the present invention include a system for facilitating play of a game of chance by multiple players at multiple locations using a virtual card deck. The system may include a plurality of terminals at the multiple locations, the terminals receiving wagers from the plurality of players, the plurality of terminals issuing tickets to the plurality of players, each ticket including a respective player hand chosen from the virtual card deck and an identification code uniquely identifying the ticket. The system may also include a plurality of displays at the multiple locations, the displays displaying a shared community hand chosen from the virtual card deck. The system may also include a server in communication with the plurality of terminals and the plurality of displays. Prior to issuance of tickets for the game, the server may select a set of removed cards from the virtual card deck. The server may receive an indication of each player's wager from a terminal and responsively providing a respective unique identification number and a respective player hand for inclusion on the ticket delivered to the player, each player hand chosen from the virtual card deck but not from the set of removed cards. The server may select the shared community hand from the set of removed cards and communicating the shared community hand to the plurality of displays for display. The server may determine if a ticket is a winning ticket in accordance with predetermined game rules, based on the player hand included on the ticket and the shared community hand. The ticket may be a printed ticket. The ticket may be an electronic ticket. Two different players may receive the same player hand. The server may also select at least one fictitious opponent hand from the removed cards and communicates the fictitious opponent hand to the plurality of displays for displays, and wherein determining if a ticket is a winning ticket is also based on the fictitious opponent hand. The ticket may be a winning ticket if the player hand combined with the shared community cards is a better poker hand than the at least one fictitious opponent hand combined with the shared community cards. An award may be awarded for the winning hand depends on the type of poker hand that is obtained when the player hand is combined with the shared community cards. The game may include multiple draws, where each issued ticket includes an indication of the draws for which the ticket is issued and player hands for each said indicated draws, the plurality of displays displays shared community hands for each draw, for each draw, the server removes a set of removed cards for the draw from the virtual card deck for that draw, provides player hands for the draw for tickets that include that draw, the player hands chosen from the virtual card deck for that draw after the removed cards for that draw have been removed, the server selects the shared community hand for the draw from the set of removed cards for that draw and communicates the shared community hand to the plurality of displays, and for each draw that is included on a ticket, the server determines if the ticket is a winning ticket in accordance with the predetermined games rules, based on the player hand included on the ticket for that draw and the shared community hand for that draw. The server may remove the set of removed cards of a draw before the server receiving an indication of any player's wager.

Another example embodiment of the present invention may be a procedure for conducting a wagering game with a virtual deck of cards. The procedure may include displaying a set of community cards, displaying a first set of opponent cards, receiving an input indicating a player's desire to participate in the wagering game, displaying a first set of player cards, determining if the first set of player cards are a winning set cards of based on the set of community cards, the first set of opponent cards and pre-determined rules, and providing an award to the player if the first set of player cards is the winning set of cards. The procedure may also include removing a set of burn cards from the deck of cards prior to selecting the first set of player cards. The procedure may also include receiving payment from the player. The deck of cards may be a standard 52-card poker cards deck. The deck of cards may include wild cards. The award may be selected from a prize table based on the pre-determined rules and is based in part on the first set of player cards, the community cards and the first set of opponent cards. The indication may be received from a terminal and the award is provided at the terminal. The first set of player cards may be displayed to the player on a printed ticket. The procedure may also include randomly selecting the set of community cards, the first set of opponent cards and the first set of player cards from the deck of cards without replacement prior to displaying the first set of player cards. The procedure may also include receiving an input indicating a player's desire to participate in a second hand in the wagering game, displaying a second set of player cards from the deck of cards, determining if the second set of player cards are a winning set cards of based on pre-determined rules, and providing an award to the player if the second set of player cards is the winning set of cards. The procedure may also include displaying a second set of opponent cards from the deck of cards, wherein the second set of opponent cards are selected from the deck of cards prior to selecting the first set of player cards. The procedure may also include receiving an input indicating a second player's desire to participate in the wagering game, displaying a set of second player cards from the deck of cards, determining if the set of second player cards are a winning set cards of based on pre-determined rules, and providing an award to the second player if the set of second player cards is the winning set of cards. The pre-determined rules may include requiring one card from the first set of player cards and the set of second player cards.

Another example embodiment of the present invention may be a system for conducting a wagering game with a virtual deck of cards. The system may include a network, a first terminal including a first input device configured to receive an indication of a first player's desire to participate in the wagering game and a first ticket dispenser configured to dispense a ticket displaying a first player's set of cards, a second terminal including a second input device configured to receive an indication of a second player's desire to participate in the wagering game and a second ticket dispenser configured to dispense a ticket displaying a second player's set of cards, a display configured to display a set of community cards, display a set of opponent cards, and display a winning set of cards based on pre-determined rules, and a server in communication with the first terminal and the second terminal via the network, the server configured to receive the indication of the first player's desire to participate in the wagering game from the first terminal through the network interface, receive the indication of the second player's desire to participate in the wagering game from the second terminal through the network interface, select the set of community cards and the set of opponent cards from the deck of cards without replacement, select the first player's set of cards and the second set of player cards from a remainder of the deck of cards, and communicate with the first terminal and the second terminal. The server may further include a prize table. The set of community cards, the set of opponent cards, the first player's set of cards and the second set of player cards may be selected randomly. The display may be further configured to display a set of burn cards and the processor may be further configured to select the set of burn cards from the deck of cards without replacement before selecting the first player's set of cards and the second set of player cards.

Another example embodiment of the present invention may be a computer readable medium including instructions adapted to execute a procedure for conducting a wagering game with a virtual deck of cards. The procedure may include displaying a set of community cards, displaying a first set of opponent cards, receiving an input indicating a player's desire to participate in the wagering game, displaying a first set of player cards, determining if the first set of player cards are a winning set cards of based on the set of community cards, the first set of opponent cards and pre-determined rules, and providing an award to the player if the first set of player cards is the winning set of cards.

FIG. 1A illustrates a first example procedure for conducting a wagering game, in accordance with a first example embodiment of the present invention. The wagering game may include a virtual deck of standard 52-card poker cards.

In 100, the procedure may select cards to be removed from the virtual deck. For example, a set of 13 cards may be removed from the virtual deck without replacement. Removing cards without replacement produces a set of removed cards with no duplicates. The set of removed cards may be randomly selected from the virtual deck.

In 102, the procedure may receive an indication from the player to participate in the wagering game. For example, the indication may be inputted by the player into a terminal. The terminal may be a stand-alone kiosk or a personal electronic device such as a personal computer, a cell phone, a personal digital assistant, or other wireless device. Alternatively, the indication may be received at a terminal through an operator. For example, the terminal may be operated by a store clerk who receives a request from the player to participate and inputs the request into the terminal.

Figure 5A:
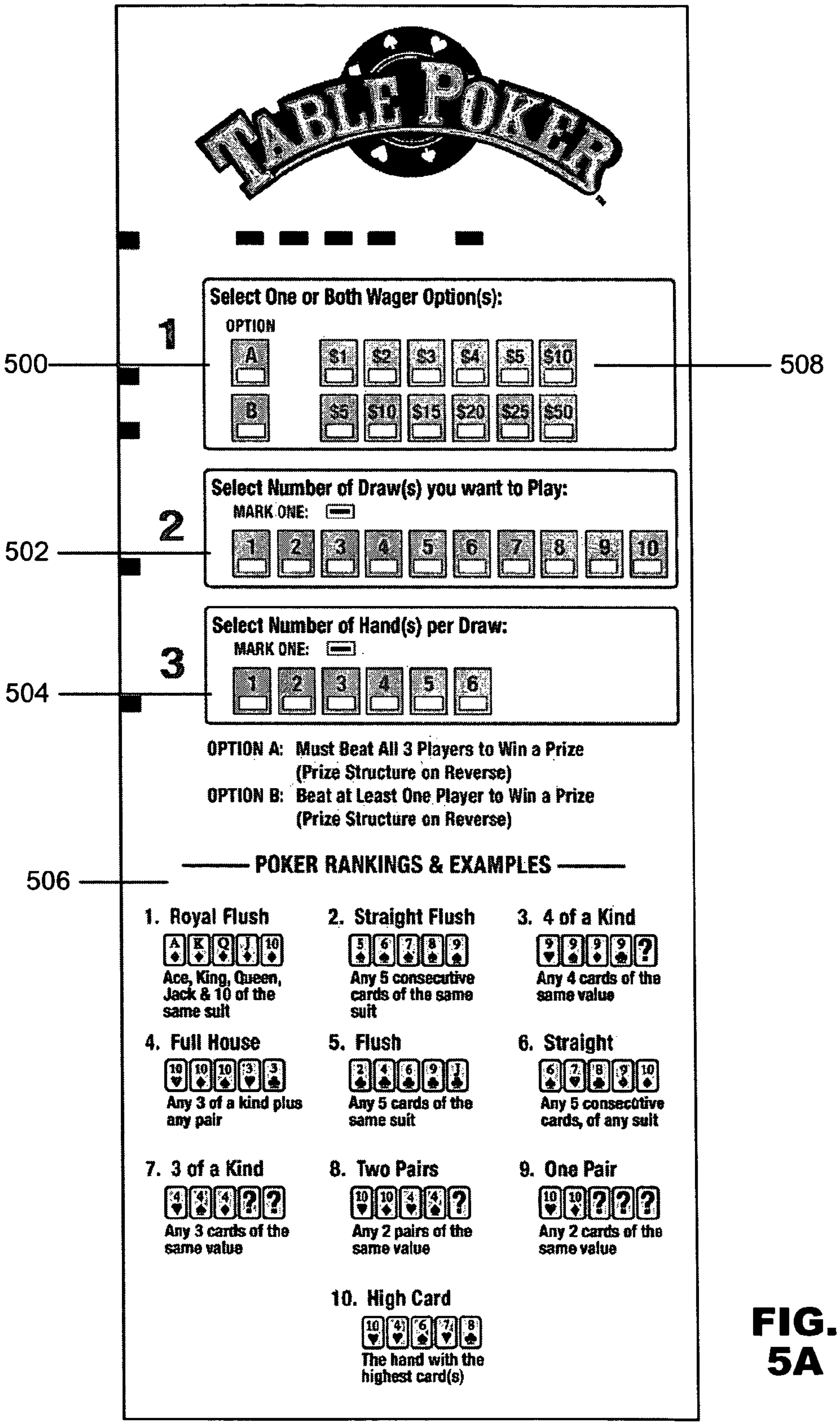
FIG. 5A illustrates a first example play slip in a wagering game, according to a first example embodiment of the present invention.
Figure 5B:
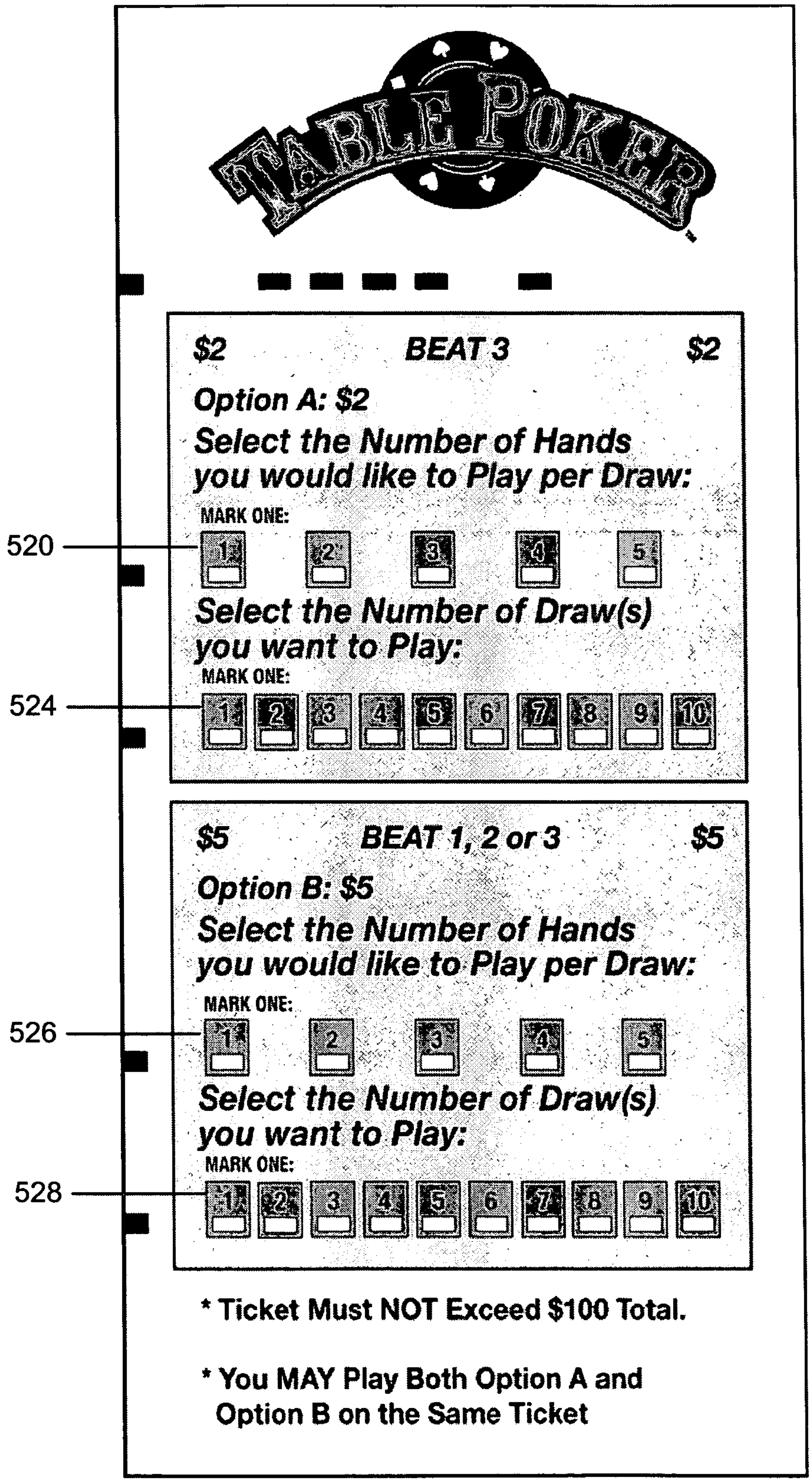
FIG. 5B illustrates a second example play slip in a wagering game, according to a second example embodiment of the present invention.

The player may indicate a desire to participate in the wagering game by completing and submitting a play slip. For example, a play slip may be as depicted in FIGS. 5A and 5B. The play slip may be machine-readable and submitted to a kiosk or terminal to be read. Alternatively, the player may indicate a desire to participate in the wagering game by selecting options in an application executing on a personal electronic device.

In 104, the procedure may optionally receive an indication of payment from the player. For example, the player may submit payment to a stand-alone kiosk in the form of currency, a debit card or a credit card. Payment may be submitted on a personal electronic device through an electronic payment method. Payment may be given to the operator operating a terminal.

In 106, the procedure may select player cards from a remainder of the virtual deck after the removed cards were removed in 100. For example, two player cards may be selected. The player cards may be randomly selected from the virtual deck without replacement.

Figure 6A:
FIG. 6A illustrates a first example ticket in a wagering game, according to a first example embodiment of the present invention.
Figure 6B:
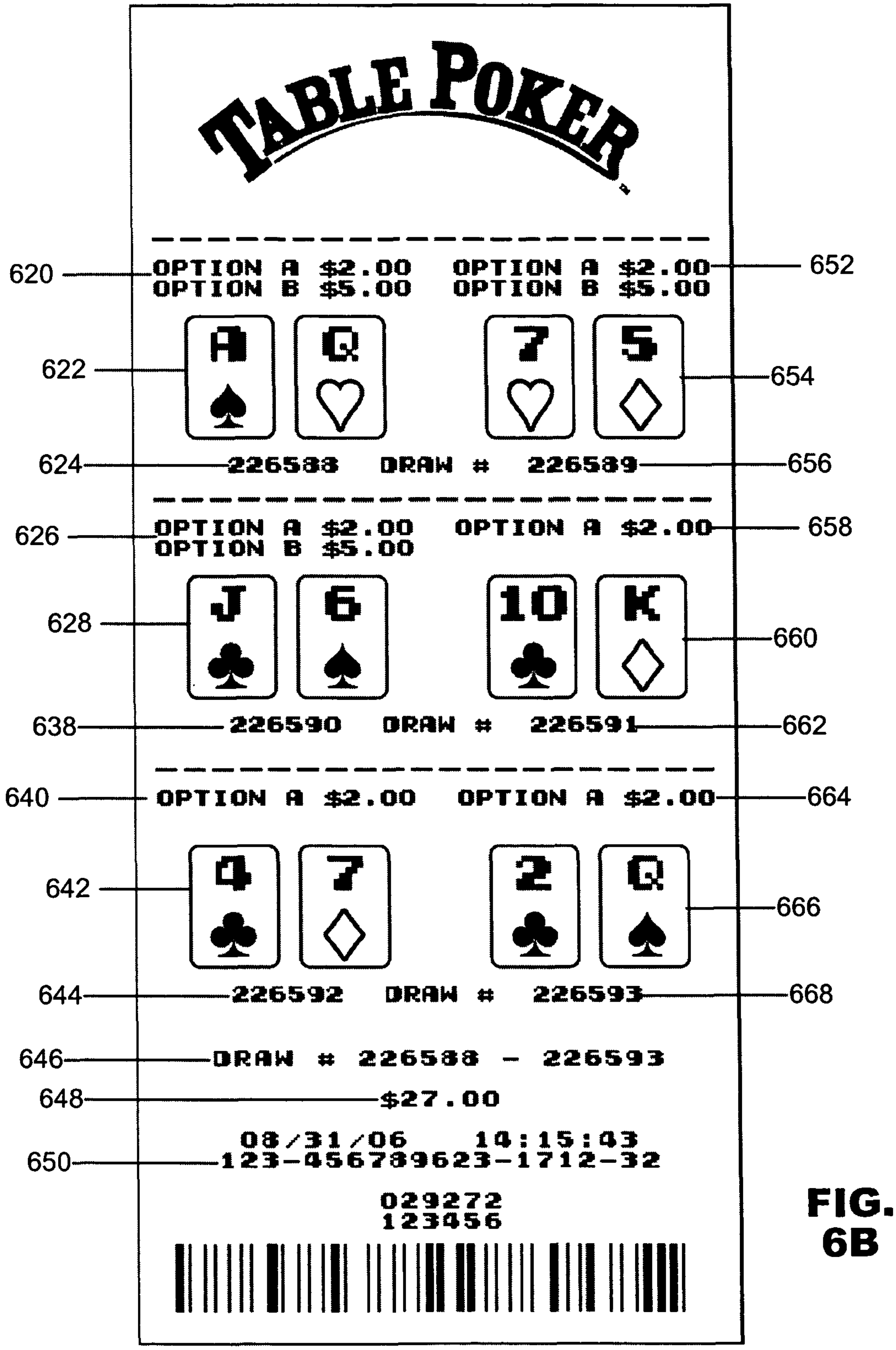
FIG. 6B illustrates a second example ticket in a wagering game, according to a second example embodiment of the present invention.

In 108, the player cards may be displayed to the player. For example, the player cards may be printed on a ticket dispensed to the player. For example, the printed ticket may be as depicted in FIGS. 6A and 6B. Alternatively, the player cards may be displayed on a screen of a personal electronic device.

Figure 4A:
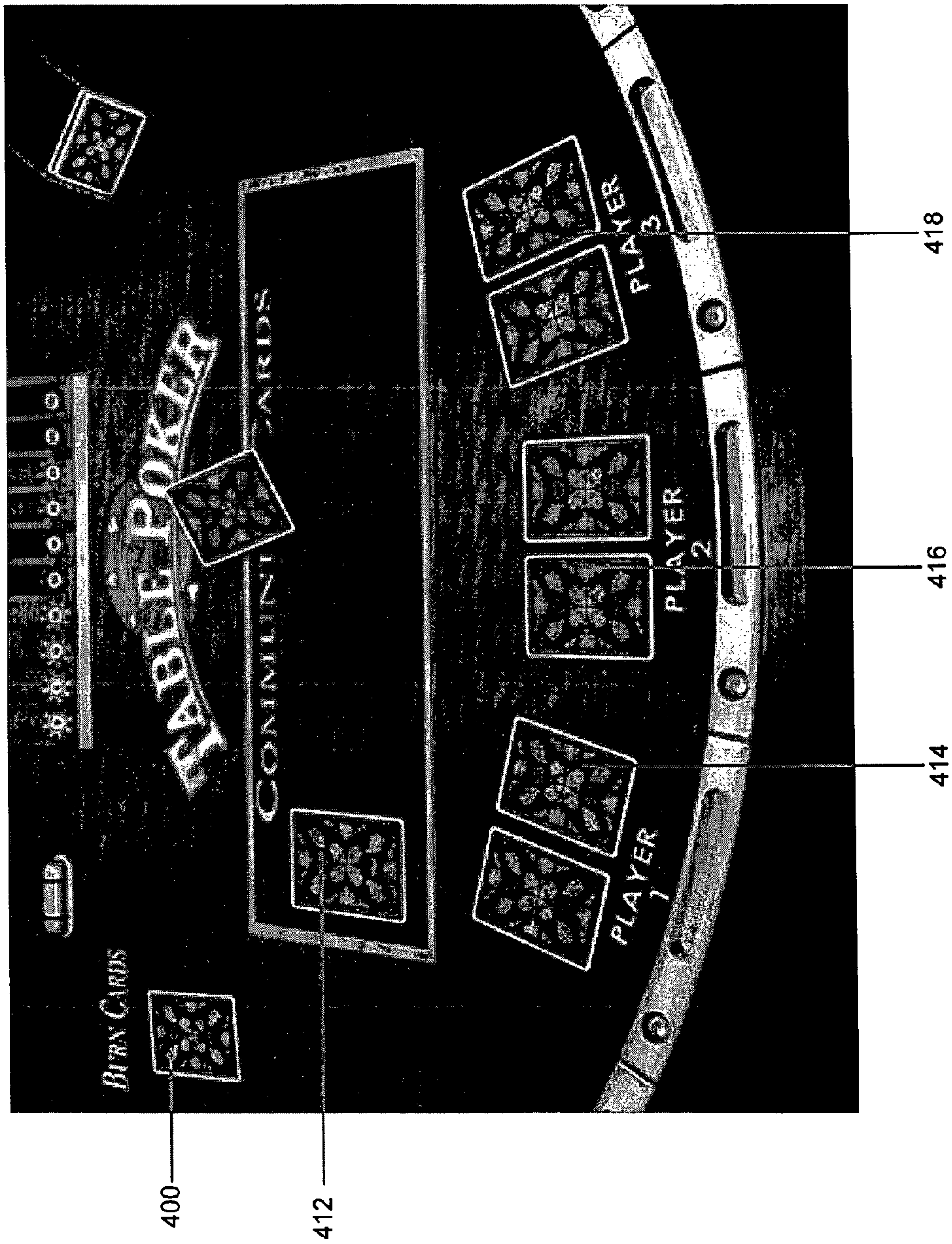
FIG. 4A illustrates an example screen shot of a display, according to an example embodiment of the present invention.
Figure 4B:
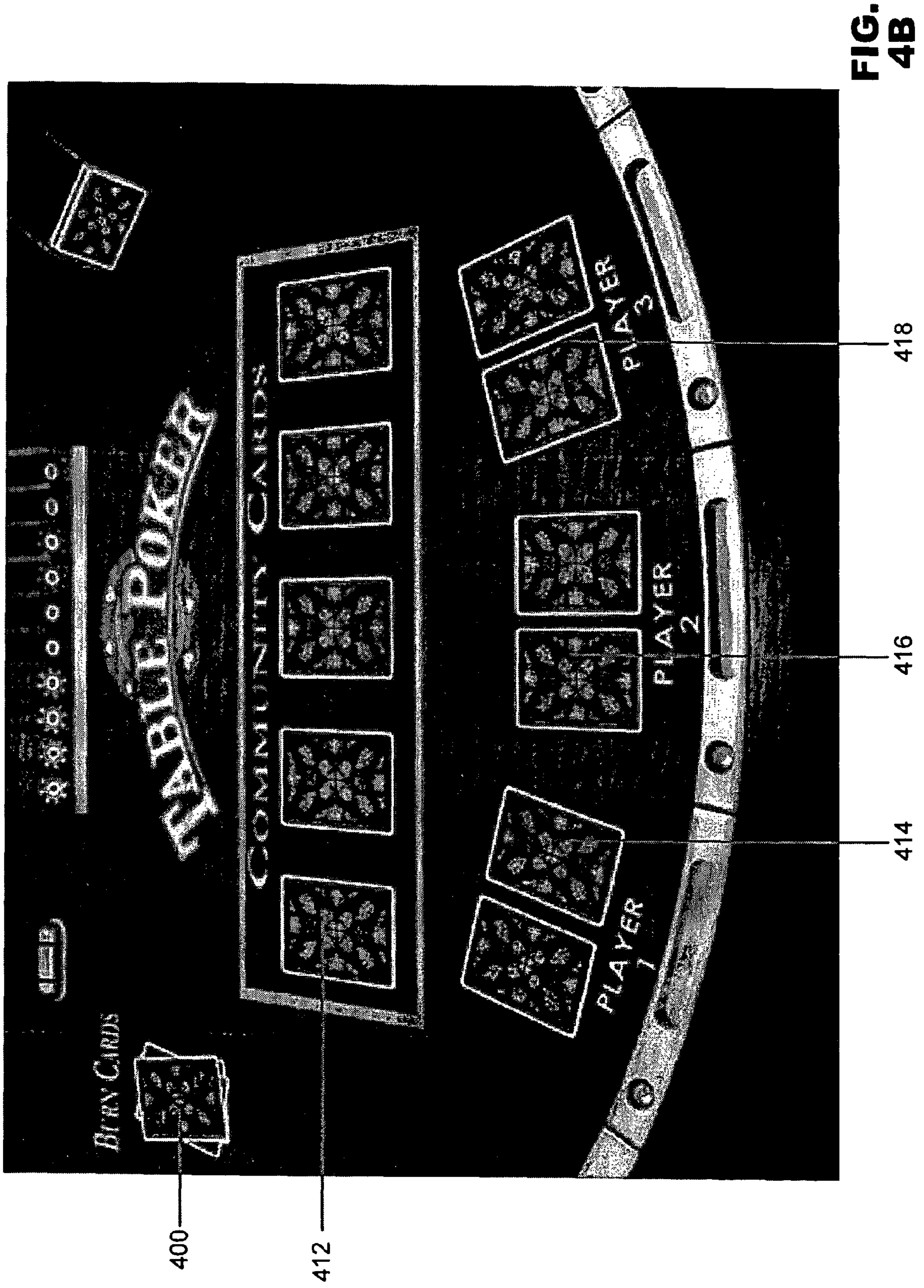
FIG. 4B illustrates an example screen shot of a display, according to an example embodiment of the present invention.
Figure 4C:
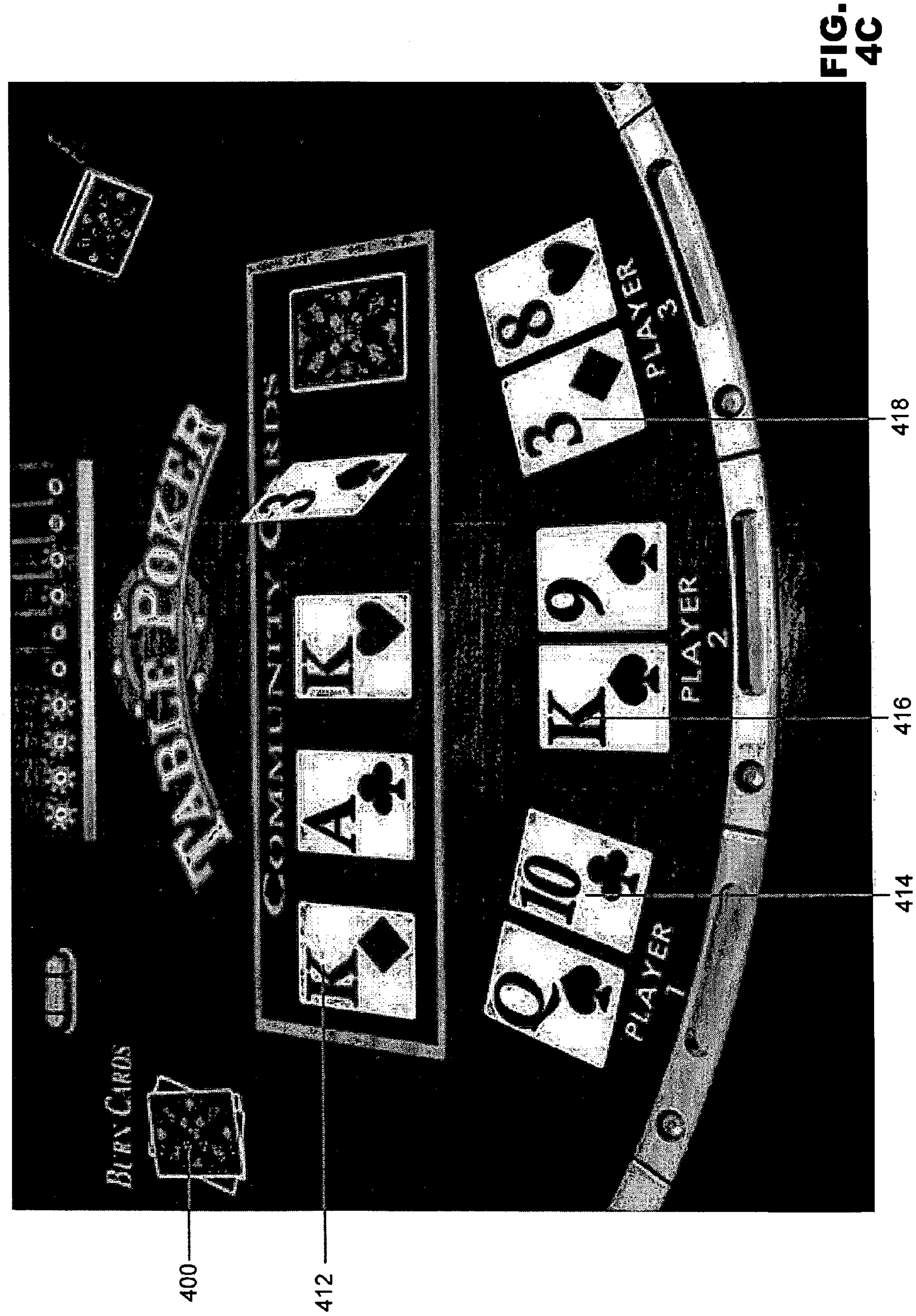
FIG. 4C illustrates an example screen shot of a display, according to an example embodiment of the present invention.

In 110, the procedure may wait until the wagering game is ready to proceed. For example, the wagering game may have a specified draw time. Until the specified draw time occurs, the procedure may wait. For example, a display may be as depicted in FIGS. 4A-4C, showing unrevealed burn cards, community cards and opponent cards.

In 112, the procedure may select community cards, opponent cards and burned cards from the removed cards removed in 100. For example, the procedure may randomly select five community cards, three sets of opponent cards with two cards in each set and two burn cards. The cards may be selected without replacement. The number of community cards, opponent cards and burn cards may be varied depending on the rules of the wagering game.

Figure 10:
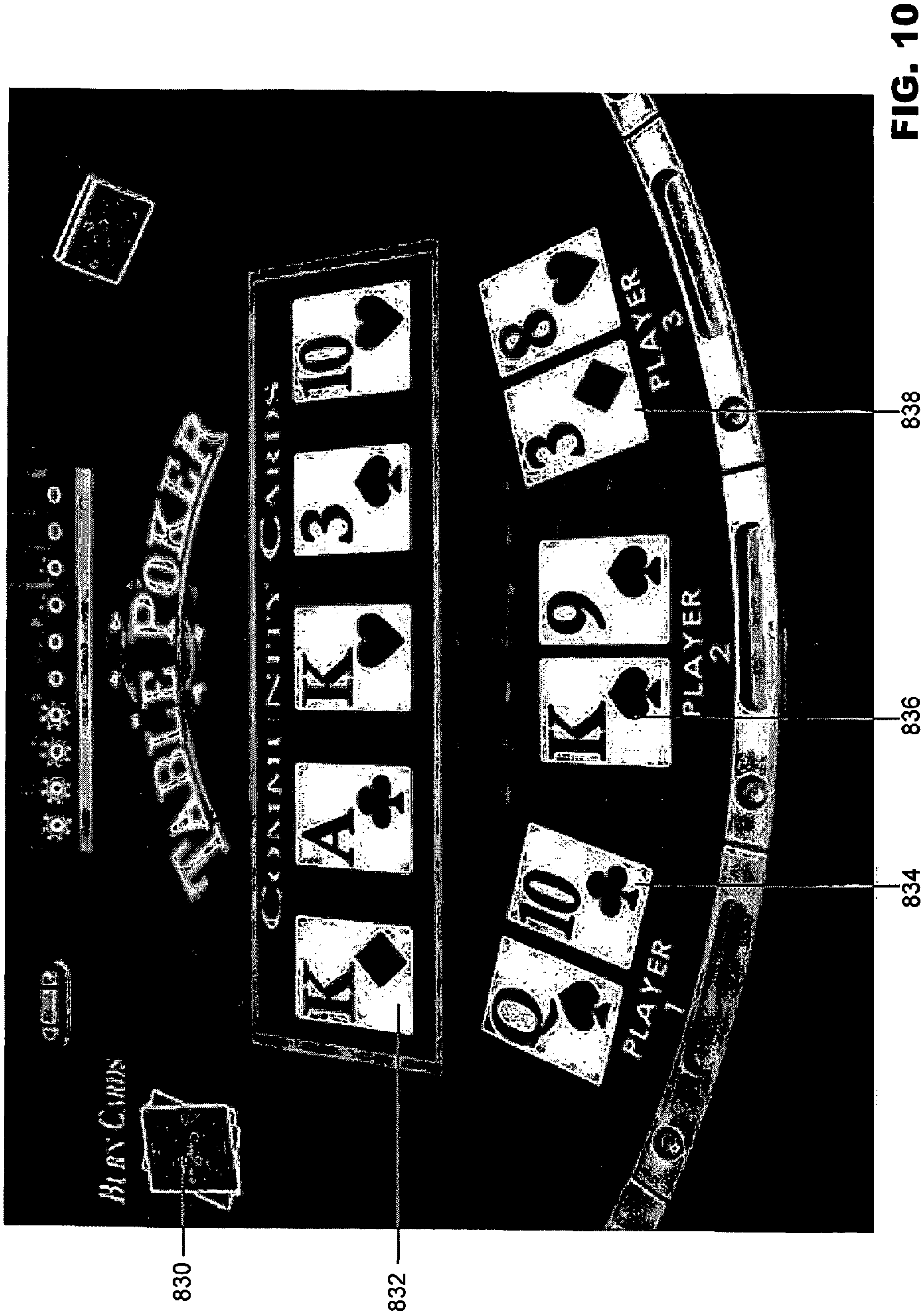
FIG. 10 illustrates a second example screen shot of a display, according to an example embodiment of the present invention.

In 114, the community cards and opponent cards may be displayed to the player. For example, the display may be as depicted in FIG. 10, showing revealed community cards and opponent cards. The burn cards may remain unrevealed.

In 116, the procedure may receive a tender of a ticket from a player. For example, the ticket may be tendered by a player to a cashier or other location where tickets may be redeemed. The ticket may be received by a kiosk or a terminal. Alternatively, a ticket ID may be submitted to the server over a network.

In 118, the procedure may test whether the player's cards are a winning set. The procedure may determine whether the player's cards are a winning set based on a variety of factors, such as what the player's cards, the community cards and the opponent cards are. The player may have selected a wagering option, for example, requiring cards that beat one, two or three opponents. The procedure may determine the player's best five card hand that can be formed by the player's two cards and the five community cards, and compare the player's hand to opponent hands comprised of each opponent's cards and the community cards. The procedure may require that the player's best five card hand include at least one of the player's cards.

If the player's cards are a winning set, the procedure may proceed to 122. If the player's cards are not a winning set, the procedure may proceed to 126.

In 120, an award may be selected from a prize records. For example, the procedure may determine a poker hand represented by a player's winning set of cards. The procedure may determine how many opponents the player beat with the winning set of cards. The procedure may then select an appropriate award from a prize records. For example, a prize records may be as depicted in FIG. 7.

In 122, the award may be provided to the player. For example, the award may provided by a cashier at a terminal where the player redeems his winning ticket. The cashier may provide currency to the player if the award is a monetary prize. If the wagering game is conducted on a player's personal electronic device, the award may be credited to the player's account.

In 124, the procedure may end.

In 126, the procedure may reject the player's ticket and display an error message. The procedure may proceed to 124 and end.

Figure 1B:
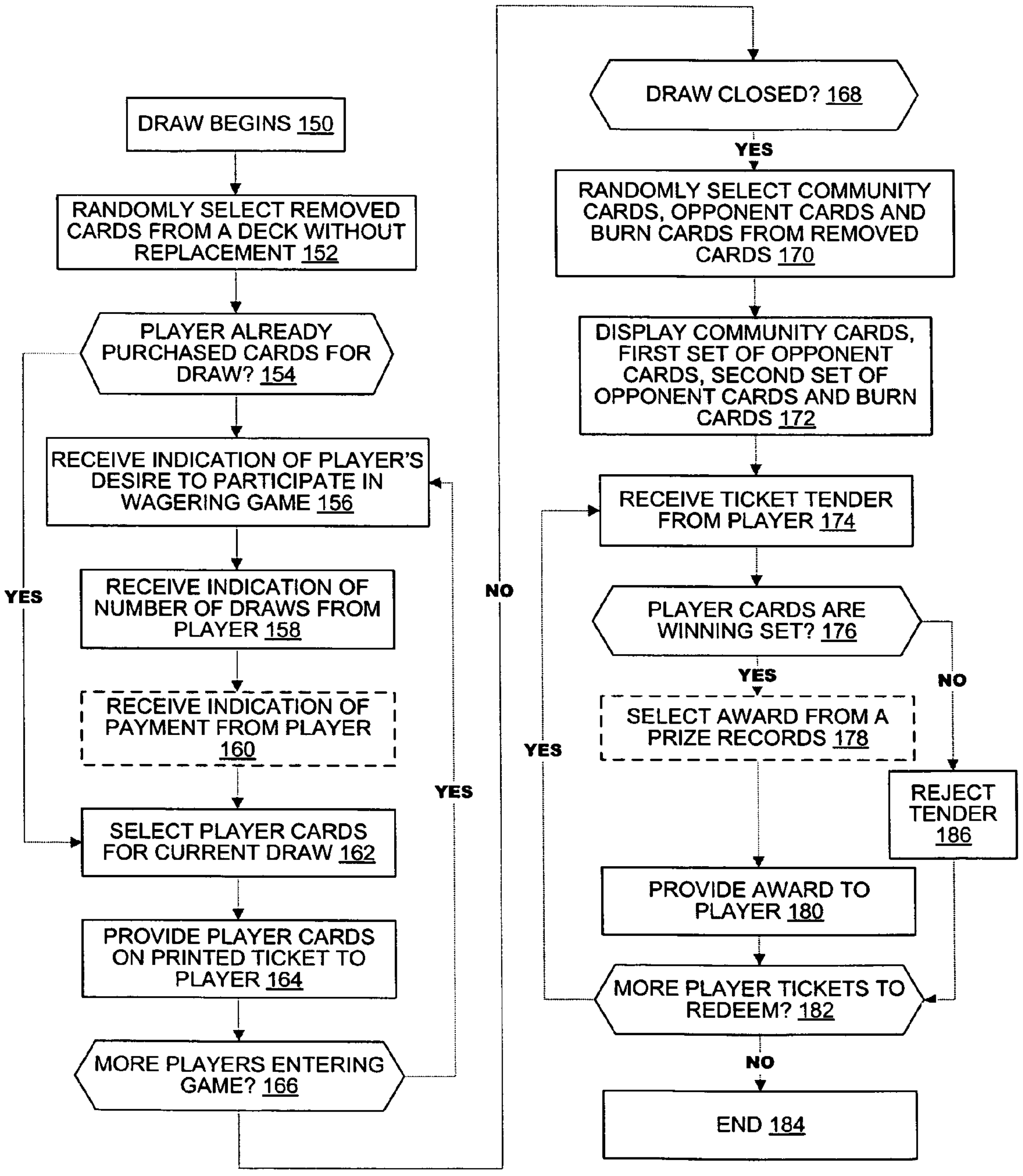
FIG. 1B illustrates a second example procedure for conducting a wagering game, in accordance with a second example embodiment of the present invention.

FIG. 1B illustrates a second example procedure for conducting a wagering game, in accordance with a second example embodiment of the present invention. The wagering game may include a virtual deck of standard 52-card poker cards. The wagering game may include one or more draws, each draw with an open time, a close time, and a draw time. The draw may select removed cards at the draw time. The wagering game may be open to players at open time, when players may choose to participate. The results may be revealed at or after the close time. Awards may be dispensed after the close time. Draws may occur concurrently, that is, the periods between the open time and close time of two draws may overlap. Draws may occur serially, so that a player will always be able to purchase tickets for a current draw. The procedure depicted in FIG. 1B may implement a single draw in the wagering game.

In 150, a draw may begin. For example, a draw may begin at the open time associated with the draw.

In 152, the procedure may select removed cards to be removed from the virtual deck. For example, a set of 13 cards may be removed from the virtual deck without replacement. Removing cards without replacement produces a set of removed cards with no duplicates. The set of removed cards may be randomly selected from the virtual deck.

In 154, the procedure may test whether the player has already purchased cards for the upcoming draw. For example, a player has may have indicated in a previous draw he desires to purchase a ticket for multiple draws. In exchange for an upfront wager, the player will receive player cards in subsequent draws. If yes, the procedure proceeds to 162. If no, the procedure proceeds to 156.

In 156, the procedure may receive an indication from the player to participate in the wagering game. For example, the indication may be inputted by the player into a terminal. The terminal may be a stand-alone kiosk or a personal electronic device such as a personal computer, a cell phone, a personal digital assistant, or other wireless device. Alternatively, the indication may be received at a terminal through an operator. For example, the terminal may be operated by a store clerk who receives a request from the player to participate and inputs the request into the terminal.

The player may indicate a desire to participate in the wagering game by completing and submitting a play slip. For example, a play slip may be as depicted in FIGS. 5A and 5B. The play slip may be machine-readable and submitted to a kiosk or terminal to be read. Alternatively, the player may indicate a desire to participate in the wagering game by selecting options in an application executing on a personal electronic device.

In 158, the procedure may receive an indication of a number of draws the player wishes to participate in. For example, draw times of multiple draws may be set at the same or similar time, so that multiple draws are available to the player for ticket purchase. In this example embodiment, draw times may be before the draw open times, allowing players to participate in draws other than those which are already opened.

In an alternative embodiment, the player may be restricted to purchasing tickets in draws that are open, where the open time has elapsed but before the close time has occurred. This limits players to only purchasing wagers in draws that are available for sale at the time of the purchase.

In 160, the procedure may optionally receive an indication of payment from the player. For example, the player may submit payment to a stand-alone kiosk in the form of currency, a debit card or a credit card. Payment may be submitted on a personal electronic device through an electronic payment method. Payment may be given to the operator operating a terminal.

In 162, the procedure may select player cards from a remainder of the virtual deck after the removed cards were removed in 152. For example, two player cards may be selected. The player cards may be randomly selected from the virtual deck without replacement. In one example embodiment, the player may receive multiple hands for the same draw. In this example embodiment, a second set of player cards may be selected, without replacement, from the remainder of the virtual deck after a first set of player cards are selected.

The remainder of the virtual deck may be reset after the player cards are selected. That is, subsequent player cards for other players may be duplicates of the player cards selected in 162.

In one example embodiment, a player may purchase multiple draws. In such an embodiment, the player will receive sufficient player cards to satisfy the multiple draws he purchased. In this example embodiment, each draw may select cards for a virtual deck associated with the draw.

In 164, the player cards may be displayed to the player. For example, the player cards may be printed on a ticket dispensed to the player. For example, the printed ticket may be as depicted in FIGS. 6A and 6B. Alternatively, the player cards may be displayed on a screen of a personal electronic device.

In 166, the procedure may test whether more players are entering the game. If yes, the procedure may proceed to 154. If no, or if the close time associated with the draw has elapsed, the procedure may proceed to 168. Multiple players may participate in the wagering game. The player cards held by different players may be duplicates.

In 168, the procedure may wait until the wagering game is ready to proceed. For example, the wagering game may have a specified draw time. Until the specified draw time occurs, the procedure may wait. For example, a display may be as depicted in FIGS. 4A-4C, showing unrevealed burn cards, community cards and opponent cards.

In 170, the procedure may select community cards, opponent cards and burned cards from the removed cards removed in 152. For example, the procedure may randomly select five community cards, three sets of opponent cards with two cards in each set and two burn cards. The cards may be selected without replacement.

Alternatively, the player cards selected in 162 may be selected from the removed cards removed in 152. In this embodiment, the community cards, opponent cards and burn cards may be selected from the remainder of the deck. For example, the removed cards may be a set of 39 cards, selected from the virtual deck without replacement.

In 172, the community cards and opponent cards may be displayed to the player. For example, the display may be as depicted in FIG. 10, showing revealed community cards and opponent cards. The burn cards may remain unrevealed.

In 174, the procedure may receive a tender of a ticket from a player. For example, the ticket may be tendered by a player to a cashier or other location where tickets may be redeemed. The ticket may be received by a kiosk or a terminal. Alternatively, a ticket ID may be submitted to the server over a network.

In 176, the procedure may test whether the player's cards are a winning set. The procedure may determine whether the player's cards are a winning set based on a variety of factors, such as what the player's cards, the community cards and the opponent cards are. The player may have selected a wagering option, for example, requiring cards that beat one, two or three opponents. The procedure may determine the player's best five card hand that can be formed by the player's two cards and the five community cards, and compare the player's hand to opponent hands comprised of each opponent's cards and the community cards. The procedure may require that the player's best five card hand include at least one of the player's cards. The player's best five card hand may be the player's poker hand.

For example, a hand may be determined from each set of opponent cards and the community cards. If the opponent hands are lower ranked than the player's poker hand, the player's poker hand may beat the opponent hands. The opponent hands may require at least one of the opponents' cards.

For example, a winning set may include a poker hand that at least matches at least one opponent hand. In a Texas Hold'Em embodiment, a winning set may include a poker hand with an equal or higher poker hand rank than at least one opponent hand. In an Omaha embodiment, a winning set may include a poker hand with an equal or lower poker hand rank than at least one opponent hand. Other types of poker hand rankings may be used, which may rank different hands. Other types of community card games may be used.

If the player's cards are a winning set, the procedure may proceed to 178. If the player's cards are not a winning set, the procedure may proceed to 186.

In 178, an award may be selected from a prize records. For example, the procedure may determine a poker hand represented by a player's winning set of cards. The procedure may determine how many opponents the player beat with the winning set of cards. The procedure may then select an appropriate award from a prize records. For example, a prize records may be as depicted in FIG. 7.

In 180, the award may be provided to the player. For example, the award may provided by a cashier at a terminal where the player redeems his winning ticket. The cashier may provide currency to the player if the award is a monetary prize. If the wagering game is conducted on a player's personal electronic device, the award may be credited to the player's account.

In 182, the procedure may test whether more player tickets need to be redeemed. For example, the procedure may check the player cards provided to players in the draw and determine how many more awards were won and will be redeemed.

If more awards will be redeemed, the procedure may proceed to 174. If no more awards will be redeemed, the procedure may proceed to 184.

In 184, the procedure may end.

In 186, the procedure may reject the player's ticket and display an error message. The procedure may proceed to 184 and end.

Figure 1C:
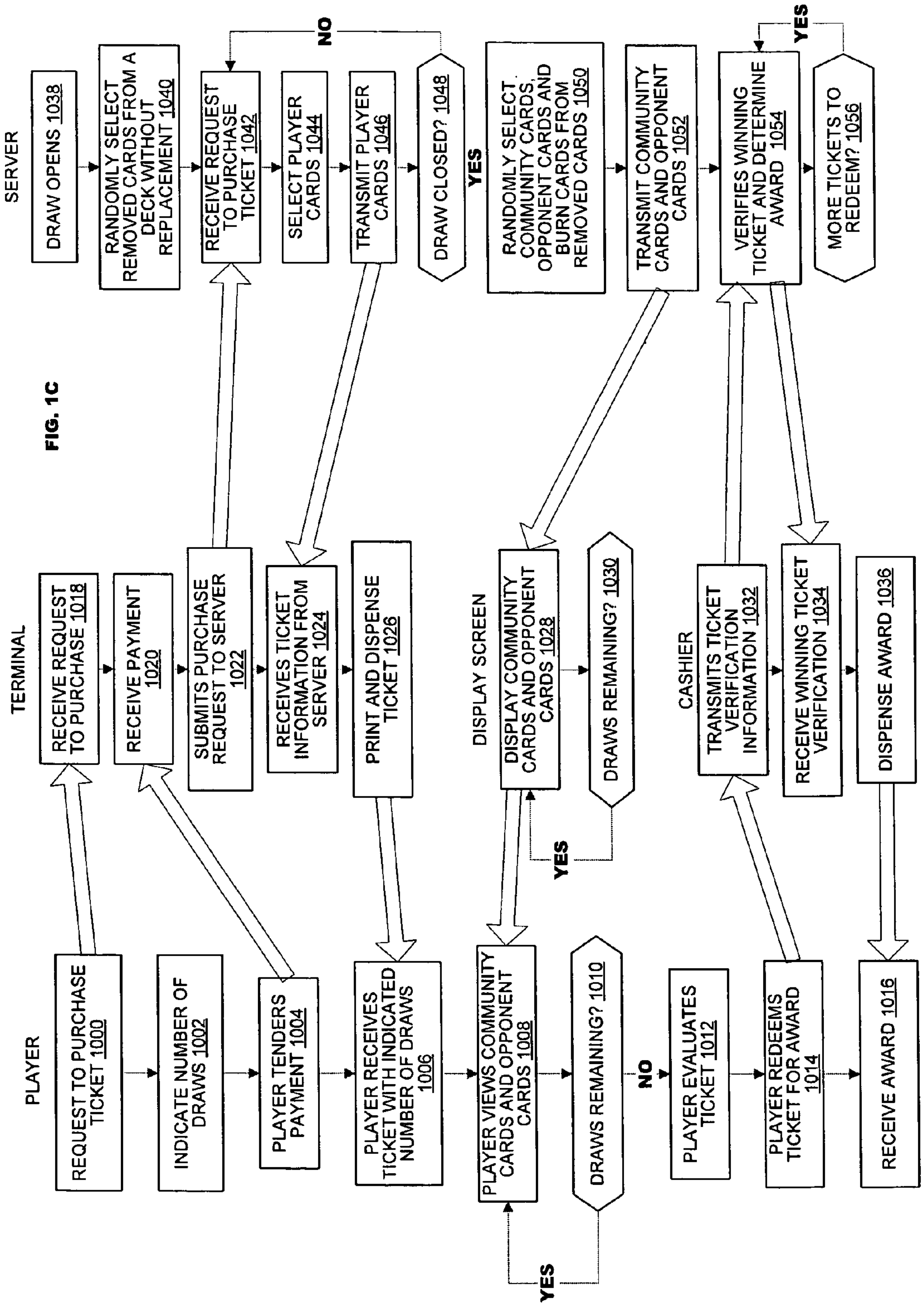
FIG. 1C illustrates a third example procedure for conducting a wagering game, in accordance with a third example embodiment of the present invention.
Figure 2:
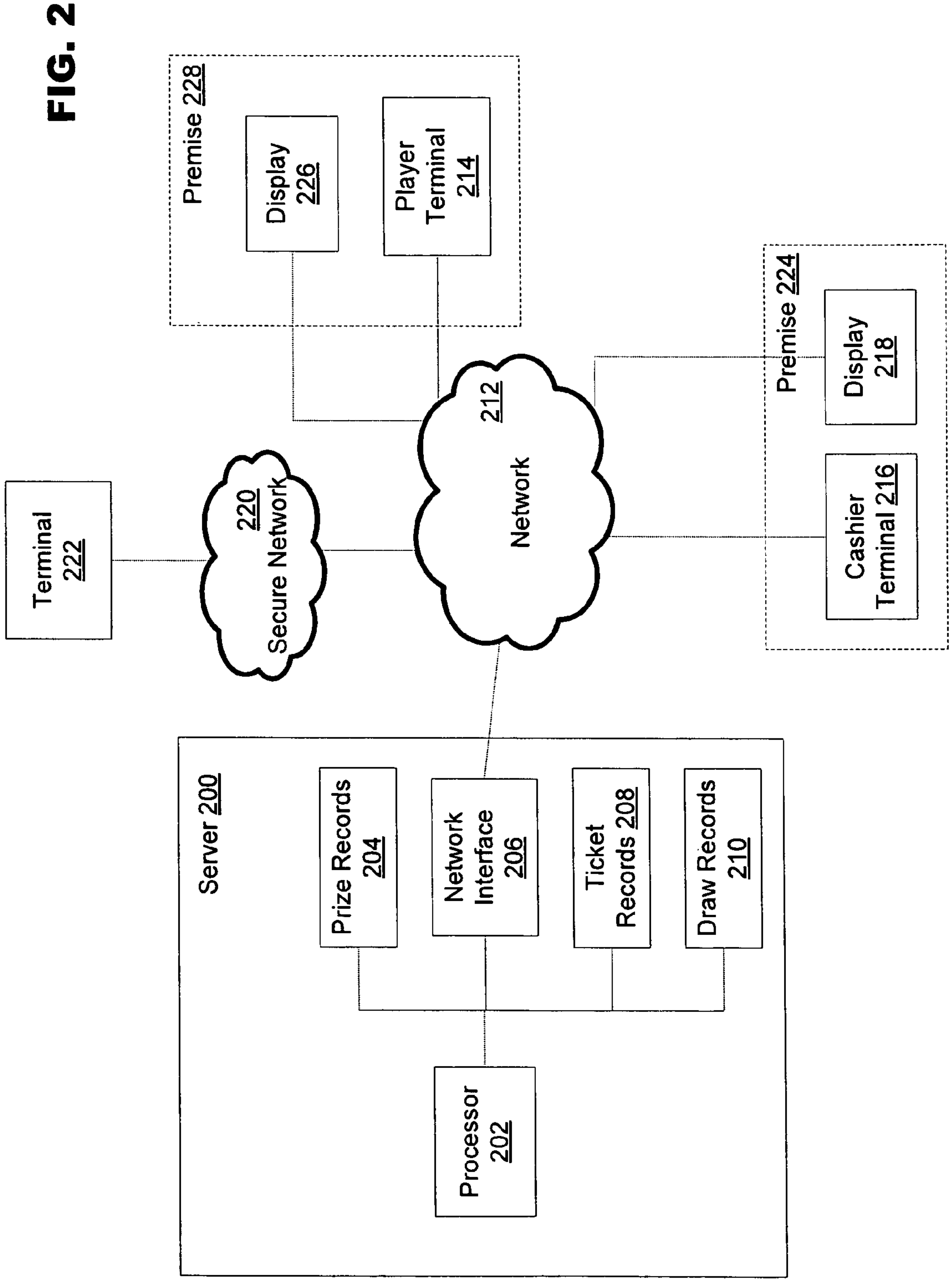
FIG. 2 illustrates an example system for conducting a wagering game, in accordance with an example embodiment of the present invention.

FIG. 1C illustrates a third example procedure for conducting a wagering game, in accordance with a third example embodiment of the present invention. A procedure for a player, a terminal, a server, a display screen and a cashier may be provided. The procedures may execute on a system as depicted in FIG. 2. Information may be transmitted and received over a network between the player, the terminal, the server, the display and the cashier and may be encrypted or otherwise secured to prevent eavesdropping and protect the integrity of the wagering game.

In 1000, a player may request to purchase a ticket in the wagering game. The player may access a terminal in communication with a server as depicted in FIG. 2. For example, a player may complete a play slip as depicted in FIGS. 5A and 5B and submit the completed play slip to a terminal. Alternatively, the player may directly input a request into the terminal. For example, the terminal may be a personal electronic device that the player has access to.

In 1002, the player may indicate a number of draws he wishes to participate. For example, the player may fill in an appropriate box on the play slip. Alternatively, the player may directly input a number of draws into the terminal or use some other method of input.

For example, the player may indicate a desire to purchase a draw which will occur in the future, either the immediate next draw or a draw subsequent to the immediate next draw.

In 1004, the player may tender payment. Payment may be cash paid to a cashier, who records the receipt of cash in the cashier terminal. Alternatively, payment may be a credit card or debit card transaction through a player terminal or a cashier terminal. The amount of payment required may be determined by a wager amount, a wagering option and the number of draws indicated in 1002. For example, a "beat one opponent" wagering option may require a lower payment than a "beat all opponents" wagering option. Requesting more draws in 1002 may result in a higher payment. The wager amount may be determined by the player or set by the wagering game.

In 1006, the player may receive a ticket with the indicated number of draws. For example, the ticket may be as depicted in FIGS. 6A and 6B. FIG. 6A depicts a ticket with player cards for one draw, while FIG. 6B depicts a ticket with player cards for six separate draws.

Alternatively, the player cards may be displayed on a screen of a personal electronic device and not printed on a ticket. Alternatively, the player cards may be displayed to the player with another method.

In 1008, the player may view the community cards and opponent cards. For example, the community cards and the opponent cards may be displayed on a screen as depicted in FIG. 10. The display may be located in a premise as described in FIG. 2. Alternatively, the display may be located on a personal electronic device accessible to the user. In a personal electronic device, the display of the community cards and opponent cards may be overlaid with a display of the player's cards. For example, the opponent cards and the opponent cards may be broadcasted from the server to a plurality of displays.

In 1010, the player may evaluate whether there are still draws remaining for which he will be participating in. The player may have selected to participate in multiple draws in 1002. If yes, the player may proceed to 1008. If no, the player may proceed to 1012.

In 1012, the player may evaluate the ticket to determine whether he has a winning ticket. A winning ticket may be a ticket which includes a winning set of cards. The player may determine whether the player's cards are a winning set based on a variety of factors, such as what the player's cards, the community cards and the opponent cards are. The player may have selected a wagering option, for example, requiring cards that beat one, two or three opponents. The procedure may determine the player's best five card hand that can be formed by the player's two cards and the five community cards, and compare the player's hand to opponent hands comprised of each opponent's cards and the community cards. The procedure may require that the player's best five card hand include at least one of the player's cards.

In 1014, the player may redeem the ticket for an award. For example, the player may provide the ticket to a cashier. Alternatively, the player may provide the ticket to a player terminal. Alternatively, the player may select to redeem an electronic ticket on a personal electronic device.

In 1016, the player may receive his award. For example, the award may be a monetary award. The monetary award may be provided by a cashier, dispensed from a terminal or credited to a player's account.

In 1018, the terminal may receive the player's request to purchase a ticket from 1000. For example, the terminal may be a cashier terminal, a player terminal or a terminal as depicted in FIG. 2.

In 1020, the terminal may receive a payment from the player from 1004. The payment may be determined by a desired wager, a wagering option and the number of draws.

In 1022, the terminal may submit a purchase request to the server. The purchase request may be submitted over a network, as depicted in FIG. 2. The purchase request may include a number of draws, a wagering option, and a wager amount.

In 1024, the terminal may receive ticket information from the server. The ticket information may be received over a network, as depicted in FIG. 2. The ticket information may include player cards for each draw the player wishes to participate in.

In 1026, the terminal may print and dispense the ticket. The ticket may be received by the player in 1006. For example, a ticket may be as depicted in FIGS. 6A and 6B. Alternatively, the player cards may be displayed to the player in another fashion. For example, the player cards may be displayed on a screen of a personal electronic device accessible to the player.

In 1028, the display screen may display community cards and opponent cards. The display may occur after a draw has closed. The player may view the community cards and opponent cards thus displayed in 1008. For example, the screen may display a screen shot similar to FIGS. 4A-4C before the community cards and opponent cards are displayed.

In 1030, the display screen may test whether draws remain. If yes, the community cards and opponent cards of the next draw will be displayed when appropriate. If no, the display screen process will end.

In 1032, the cashier may transmit ticket verification to the server. The ticket verification information may be received from the player in 1014, when the player tenders the ticket. For example, the player may tender a paper ticket to a terminal, either a self-serve player terminal or a cashier-operated cashier terminal, as depicted in FIG. 2. Alternatively, the ticket verification information may be received from the player electronically if the player accesses the wagering game over a personal electronic device.

In 1034, the cashier may receive a winning ticket verification from the server. The winning ticket verification may be received in response to the ticket verification information sent to the server in 1032.

In 1036, the cashier may dispense the award to the player, who receives the award in 1016. If the cashier is unable to dispense the award, an error message may be sent to the server or a local technician for handling.

In 1038, the server begins a draw, where players may purchase wagers in the wagering game. For example, a draw may begin after the open time associated with the draw has elapsed. A virtual deck of cards may be instantiated in the server.

In 1040, the server may select removed cards from a deck. For example, server may select removed cards to be removed from the virtual deck. For example, a set of 13 cards may be removed from the virtual deck without replacement. Removing cards without replacement produces a set of removed cards with no duplicates. The set of removed cards may be randomly selected from the virtual deck.

In 1042, the server receives a request to purchase tickets. For example, the request may be received from the terminal in 1022. The request may include an indication from the player to participate in the wagering game. For example, the indication may be inputted by the player into a terminal. Alternatively, the indication may be received at a terminal through an operator. For example, the terminal may be operated by a store clerk who receives a request from the player to participate and inputs the request into the terminal.

The player may indicate a desire to participate in the wagering game by completing and submitting a play slip. For example, a play slip may be as depicted in FIGS. 5A and 5B. The play slip may be machine-readable and submitted to a kiosk or terminal to be read. Alternatively, the player may indicate a desire to participate in the wagering game by selecting options in an application executing on a personal electronic device.

The request to purchase ticket may include an indication of a number of draws the player wishes to participate in. For example, draw times of multiple draws may be set at the same time, so that multiple draws are available to the player for ticket purchase. In this example embodiment, draw times may be before the draw open times, allowing players to participate in draws other than those which are already opened.

In an alternative embodiment, the player may be restricted to purchasing tickets in draws that are open, where the open time has elapsed but before the close time has occurred. This limits players to only purchasing wagers in draws that are available for sale at the time of the purchase.

The request to purchase ticket may include an indication of payment from the player. For example, the player may submit payment to a stand-alone kiosk in the form of currency, a debit card or a credit card. Payment may be submitted on a personal electronic device through an electronic payment method. Payment may be given to the operator operating a terminal.

In addition, the request to purchase ticket may include a wagering option and a wager amount selected by the player.

In 1044, the server selects player cards from a remainder of the virtual deck after the removed cards were removed in 1040. For example, two player cards may be selected. The player cards may be randomly selected from the virtual deck without replacement. In one example embodiment, a player may purchase multiple draws. In such an embodiment, the player will receive sufficient player cards to satisfy the multiple draws he purchased.

In 1046, the server transmits the player cards to the terminal. The terminal receives the player cards in 1024. The player cards may be two cards selected from the virtual deck in 1042.

In 1048, the server tests whether the draw is closed. For example, the draw may close after the close time of the draw has elapsed. Alternatively, the draw may close after a predetermined number of players have purchased tickets. Alternatively, the draw may close after any other predetermined condition has been met. If yes, the procedure proceeds to 1050. If no, the procedure proceeds to 1042, where more player cards may be selected for other players who have purchased a ticket.

In 1050, the server randomly selects community cards, opponent cards and burn cards from the removed cards. The removed cards may be those removed in 1040. For example, the procedure may randomly select five community cards, three sets of opponent cards with two cards in each set and two burn cards. The cards may be selected without replacement.

In 1052, the server may transmit the community cards and opponent cards to the display screen in 1028.

In 1054, the server may verify winning ticket information received from the cashier at 1032. If the winning ticket information is verified, the server may select an award and transmit the winning ticket verification and the award to the cashier at 1034. For example, each ticket may be associated with a verification code as depicted in FIGS. 6A and 6B. The server may verify the verification code is correct.

An award may be selected from a prize records. For example, the server may determine a poker hand represented by a player's winning set of cards. The server may determine how many opponents the player beat with the winning set of cards. The server may then select an appropriate award from a prize records. For example, a prize records may be as depicted in FIG. 7.

In 1056, the server may test whether there are more tickets to redeem. For example, the server may examine the community cards, the opponent cards and the dispensed player cards to determine whether unredeemed winning tickets were sold for the draw. If yes, the procedure proceeds to 1054. If no, the procedure ends.

FIG. 2 illustrates an example system for conducting a wagering game, in accordance with an example embodiment of the present invention. The wagering game may be conduct across a geographical area, such as a city or state.

The server 200 may be in a central location and include a plurality of components.

A processor 202 may be configured to execute a procedure as depicted in FIGS. 1A and 1B. Alternatively, multiple processors may be used in the server to implement the same functionality.

A prize records 204 may be stored in the server 200. The prize records 204 may include records of prizes to be dispensed in the wagering game and may be as depicted in FIG. 7.

A ticket records 208 may be stored in the server 200. The ticket records 208 may include records of tickets sold in the system and may be as depicted in FIGS. 8A and 8B.

A draw records 210 may be stored in the server 200. The draw records 210 may include records of draws played in the wagering game in the system and may be as depicted in FIGS. 9A and 9B.

The prize records 204, ticket records 208 and draw records 210 may be stored on a re-writable medium in server 200, such as a hard drive, random access memory (RAM), flash memory, or other medium. The prize records 204, ticket records 208 and draw records 210 may be regularly saved to a second medium located away from the server 200 for backup purposes. The prize records 204, ticket records 208 and draw records 210 may be accessible by the processor 202.

The server 200 may include a network interface 206. The network interface 206 may be configured to interface between the processor 202 and a network 212. For example, the network 212 may be the Internet, a local network, or another network over which the server 200 may communicate.

Figure 3:
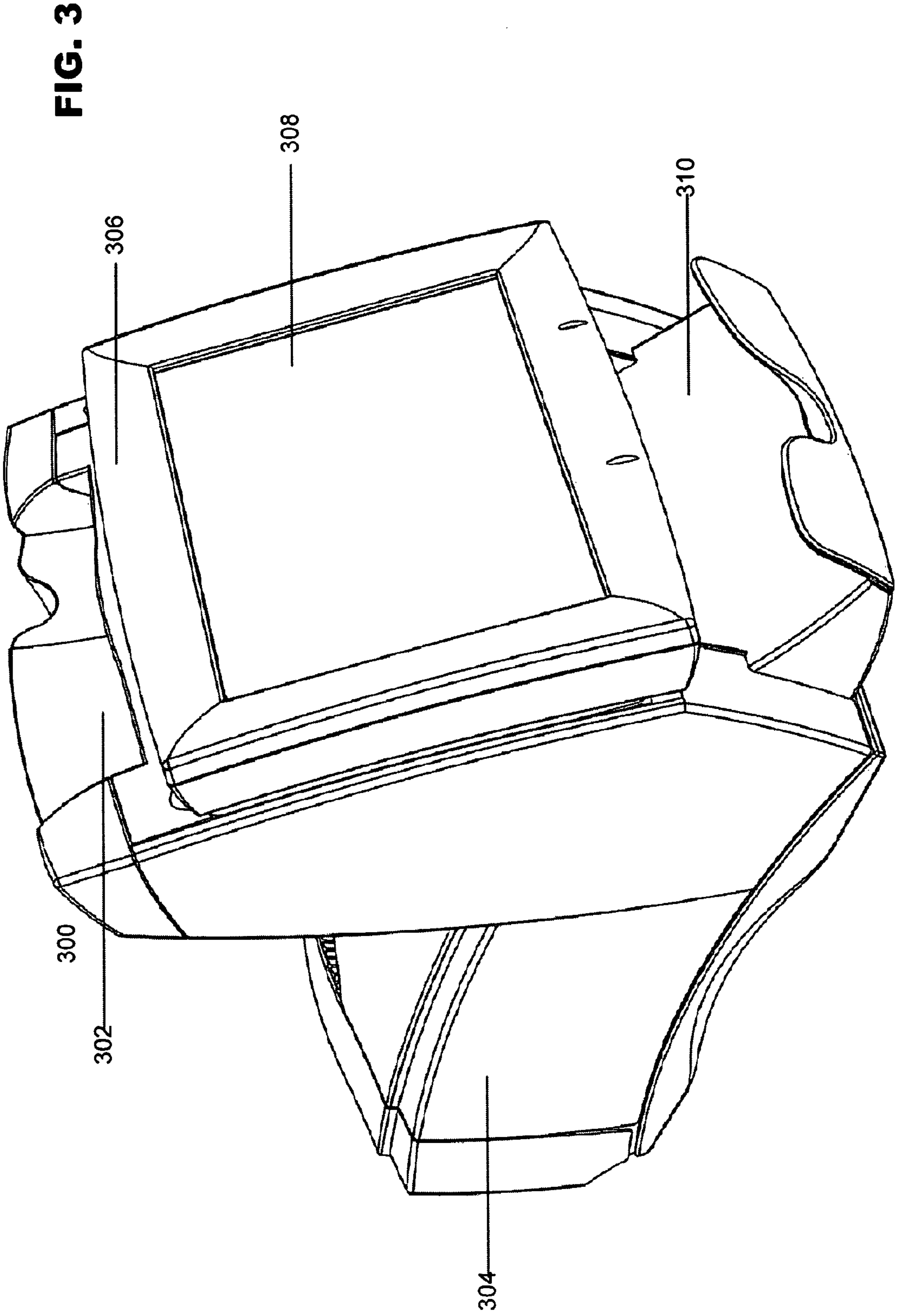
FIG. 3 illustrates an example terminal for conducting a wagering game, according to an example embodiment of the present invention.

A cashier terminal 216 may be located with a display 218 at a premise 224. The cashier terminal 216 and the display 218 may be in communication with the server 200 through the network 212 and the network interface 200. The display 218 may be configured to display screens such as those depicted in FIGS. 4 and 10. The cashier terminal 216 may be as depicted in FIG. 3. The cashier terminal 216 may be configured for operation by a clerk in response to a player request to participate in the wagering game. The premise 224 may be a location where the wagering game is conducted. For example, the premise 224 may be a social establishment such as a lounge, a bar, a restaurant, a casino, or any other location. The premise 224 may be licensed by a gaming authority to conduct the wagering game.

A player terminal 214 may be located with a display 226 at a premise 228. For example, the player terminal 214 may be a self-operated kiosk that accepts payment from a player and dispenses tickets. The display 226 may be similar to the display 218. The premise 228 may be similar to premise 224.

A terminal 222 may interface with the server 200 through a secure network 220, the network 212 and the network interface 206. For example, the secure network 220 may be a network configured to carry encrypted communications, a virtual private network (VPN) or other network. For example, the terminal 222 may similar to the cashier terminal 216 or the player terminal 214. Alternatively, the terminal 222 may be a personal electronic device accessed by the player.

The cashier terminal 216, the player terminal 214 and the terminal 222 may execute applications that communicate with the server 200. Together, the server 200 and the terminals may implement the procedures depicted in FIGS. 1A, 1B and 1C.

FIG. 3 illustrates an example terminal for conducting a wagering game, according to an example embodiment of the present invention. A terminal 300 may be part of a system as depicted in FIG. 2, and placed in a premise along with a display screen. The terminal 300 may be configured to receive player play slips as depicted in FIGS. 5A and 5B and dispense tickets as depicted in FIGS. 6A and 6B, while the display screen displays outcomes to games, as depicted in FIGS. 4A, 4B and 4C.

The terminal 300 may include a play slip acceptor 302. For example, the play slips may be as depicted in FIGS. 5A and 5B. The play slips may be filled out by the player and indicate the player's desire to participate in the wagering game as well as the player's selected options in the wagering game. The play slip acceptor 302 may include a machine-readable code reader that scans the player's play slip as input to be processed before the terminal 300 generates a ticket.

The terminal 300 may include a body 304. The body 304 may include a rigid tamper-resistant shell that substantially encloses the internal components of the terminal 300. Internal components of the terminal 300 may include a processor, memory, video card, encryption/decryption components, a prize table, and a network interface card.

The terminal 300 may include a display screen frame 306. The display screen frame 306 may surround and support the display screen 308.

The terminal 300 may include a display screen 308. The display screen 308 may be configured to display output to the player. The display screen 308 may be a touch screen display configured to accept input from the player. The display screen 308 may be configured to interact with the player in a process to provide the player with a ticket.

The terminal 300 may include dispenser 310. The dispenser may be configured to dispense a ticket to the player, the ticket as depicted in FIGS. 6A and 6B.

The terminal 300 may further include inputs accessible to a player using the terminal. For example, inputs may include a keyboard, pointing device, buttons, a scroll wheel, or a microphone. The terminal 300 may communicate with a server over a network through a network interface card. For example, the network may be a private network or a virtual private network.

The terminal 300 may include a currency acceptor. The currency acceptor may be configured to accept cash, credit cards, debit cards, or any other form of legal tender. For example, credit cards and debit cards may be magnetic cards issued by financial institutions, or a proprietary card issued by the operator of the premise. The currency acceptor may include a plurality of slots for receiving different types of currency.

FIGS. 4A, 4B and 4C illustrate example screen shots of a display, according to an example embodiment of the present invention. The display may be broadcasted from the server to all displays as depicted in FIG. 2. For example, the display may be a screen mounted in a premise. Alternatively, the display may be a window or an area on a screen of a personal computer or wireless device.

The display may include a representation of burn cards 400. For example, the game may include two burn cards which are not revealed. The display may include a representation of unrevealed community cards 412. For example, the game may include five community cards. The display may include a representation of unrevealed opponent cards 414, 416 and 418. Each set of opponent cards may include two cards. The game may include three opponents. Alternatively, the game may include any number of opponents.

As depicted, FIG. 4A depicts the display when the community cards animated in a simulated deal. FIG. 4B depicts the display after the community cards have finished being animated in a simulated deal. FIG. 4C depicts the display as the community cards are being revealed.

FIG. 5A illustrates a first example play slip in a wagering game, according to a first example embodiment of the present invention. The play slip may be machine-readable, for example, readable by a cashier terminal or player terminal as depicted in FIG. 2. The play slip may be marked by a player to indicate a wager desired by the player in the wagering game. For example, the play slip may be marked by a number 2 lead pencil.

Area 500 may allow the player to choose one of two wagering options. For example, option A may require the player to beat all three opponents in order to win an award. Option B may provide an award if the player beats any one of the three opponents.

Area 508 may allow the player to choose a wager amount. For example, the player may choose to wager any amount indicated in area 508 by marking one appropriate box. In another embodiment, the player may choose to wager any amount by marking one or more appropriate boxes in area 508.

Area 802 may allow the player to choose a number of draws to participate in. The wagering game may include multiple draws or draws as described in FIG. 1B. Each draw may have a draw time, when the community cards and opponent cards are drawn. Each draw may also have a begin time, when players may receive player cards. Each draw may also have a close time, when no more tickets may be purchased and the community cards and opponent cards are displayed and the players may determine if their cards are winning cards. At the end of each draw, the player may receive his award if he holds winning cards.

Area 504 may allow the player to choose a number of hands for each draw. Because player cards are selected from the remainder of the virtual deck as described in FIGS. 1A and 1B, an unlimited number of player cards may be dispensed as they may duplicate each other. Thus, each player may play an unlimited number of hands per draw, and each draw may include an unlimited number of players. In this example embodiment, the player is limited to six hands per draw per pay slip.

Area 506 may provide rules for the wagering game. For example, area 506 may provide rankings of poker hands as used in the wagering game.

FIG. 5B illustrates a second example play slip in a wagering game, according to a second example embodiment of the present invention. The play slip may be machine-readable, for example, readable by a cashier terminal or player terminal as depicted in FIG. 2. The play slip may be marked by a player to indicate a wager desired by the player in the wagering game. For example, the play slip may be marked by a number 2 lead pencil.

Area 520 may allow the player to choose a number of hands to play in each draw, similar to area 504 depicted in FIG. 5A. For example, choosing options in area 520 may automatically select the wagering options of "beat all three opponents" and a wager amount of $2. The wagering options may be similar to those described in area 500 depicted in FIG. 5A.

Area 524 may allow the player to choose a number of draws to play in the wager game, similar to area 802 depicted in FIG. 5A.

Area 526 may allow the player to choose a number of hands to play in each draw, similar to area 504 depicted in FIG. 5A. For example, choosing options in area 526 may automatically select the wagering options of "beat one, two or three opponents" and a wager amount of $5. The wagering options may be similar to those described in area 500 depicted in FIG. 5A.

FIG. 6A illustrates a first example ticket in a wagering game, according to a first example embodiment of the present invention. A ticket may be provided in response to a play slip depicted in FIG. 5A filled in by the player.

In area 600, the ticket may indicate which wagering option was selected by the player. The wagering option may be stored in the ticket records depicted in FIGS. 8A and 8B in the field Rules Selected.

In area 602, the ticket may indicate a wager amount selected by the player. The wager amount may be stored in the ticket records depicted in FIGS. 8A and 8B.

In area 604, the ticket may indicate the player cards received by the player. The play cards may be stored in the ticket records depicted in FIGS. 8A and 8B.

In area 606, the ticket may indicate a draw or draw identifier. The draw identifier may correspond to an identifier associated with the draw for which the ticket is valid. The draw identifier may correspond to a record in the draw records depicted in FIGS. 9A and 9B. The draw identifier may also be stored in the ticket records depicted in FIGS. 8A and 8B in the field Draws.

In area 608, the ticket indicates a date and time the ticket was purchased. The date and time may be stored in the ticket records depicted in FIGS. 8A and 8B in the field Time of Purchase.

In area 610, the ticket may indicate an authorization number. For example, the authorization number may be a checksum number or other security feature used to verify the ticket at redemption. The authorization number may be stored in the ticket records depicted in FIGS. 8A and 8B in the field Auth Code.

In area 612, the ticket may provide a machine-readable code for use at a cashier terminal or a player terminal depicted in FIG. 2 when the ticket is being redeemed.

FIG. 6B illustrates a second example ticket in a wagering game, according to a second example embodiment of the present invention. A ticket may be provided in response to a play slip depicted in FIG. 5B filled in by the player. In the ticket depicted in FIG. 6B, the player had selected six draws of option A and three draws of option B.

Areas 620, 626, 640, 652, 658 and 664 may indicate the options selected in each of the respective draws or draws selected by the player. As can be seen, the first three draws include wagering options A and B, while the last three draws include only wagering option B.

In an alternative embodiment, the player may receive separate cards for each option. Thus, a player may receive two cards for wagering option A and another two cards for wagering option B. The two cards for option A and the two cards for option B may be unique or may be duplicative.

Areas 622, 658, 642, 654, 660 and 666 may indicate the player cards received by the player in each draw. There may be duplicate cards among the player cards of different draws because each set of two player cards for a draw is selected from the remainder of the virtual deck used in that draw.

Areas 624, 638, 644, 656, 662 and 668 may indicate the draw identifier of the draw for which the player cards are valid. The draw identifier may correspond to an identifier associated with the draw for which the ticket is valid. The draw identifier may correspond to a record in the draw records depicted in FIGS. 9A and 9B. The draw identifier may also be stored in the ticket records depicted in FIGS. 8A and 8B in the field Draws.

Area 646 may indicate all the draw identifiers of areas 624, 638, 644, 656, 662 and 668, and thus, the draws for which the ticket is valid.

Area 648 may indicate the aggregate wager amount of the ticket. For example, the aggregate wager amount may be used to enforce a minimum bet for each ticket in the wagering game.

Area 650 may include a date and time of purchase and an authorization number. The date and time may be stored in the ticket records depicted in FIGS. 8A and 8B in the field Time of Purchase. For example, the authorization number may be a checksum number or other security feature used to verify the ticket at redemption. The authorization number may be stored in the ticket records depicted in FIGS. 8A and 8B in the field Auth Code.

FIG. 7 illustrates an example embodiment of a prize table, according to an example embodiment of the present invention. A prize table 700 may be included in a server and used to determine what award to dispense to a player when a winning ticket is redeemed. The prize table 700 may include a hand column 702. The hand column 702 may list the possible winning hands in the wagering game. For example, the hand column 702 may list standard poker hands, such as royal flush, straight flush, four of a kind, full house, flush, straight, three of a kind, two pairs, one pair and high card. The composition of the standard poker hands may be as is conventionally known.

Prize column 704 may include the award to be dispensed to a player when his hand wins against one opponent with a particular poker hand. For example, if a player receives a full house and wins against one opponent, an award of $10 may be dispensed.

Prize column 706 may include the award to be dispensed to a player when his hand wins against two opponents with a particular poker hand. For example, if a player receives a full house and wins against two opponents, an award of $20 may be dispensed.

Prize column 708 may include the award to be dispensed to a player when his hand wins against three opponents with a particular poker hand. For example, if a player receives a full house and wins against three opponents, an award of $30 may be dispensed.

The prize table 700 may include a plurality of rows 710'. Each row 710' may correspond to a poker hand and include awards to be dispenses to the player in different winning situations. For example, winning situations may be beating one opponent, beating two opponents or beating three opponents.

Other implementations of the prize table 700 are possible. For example, non-standard poker hands may be used in column 702. Non-standard poker hands may include wild card combinations. For example, wild cards may be additional cards inserted into a 52-card deck. Alternatively, wild cards may be designated existing cards within the 52-card deck.

FIG. 8A illustrates an example embodiment of a ticket records, according to an example embodiment of the present invention. Each ticket used in the wagering game may be stored in ticket records 800. The ticket records 800 may include a plurality of records 802, each record 802 representing one ticket in the wagering game.

It will be appreciated that the ticket records 800 may be stored in a variety of ways. For example, it may be stored as a tab delimited or comma delimited flat file, in a relational database or another storage method accessible to a lottery host. The ticket records 800 may be used for accounting, auditing, or fraud-detection purposes. For example, the ticket records 800 may be checked for abnormally high concentration of prizes being sold from a particular location or to a particular player or set of players.

FIG. 8B illustrates an example embodiment of a ticket records entry, according to an example embodiment of the present invention. Each ticket records entry may be a record 802. Each record 802 may contain a variety of information, such as a Ticket ID 804. Each ticket in the wagering game may include a Ticket ID 804. The identifier may be an alphanumeric sequence of characters. The identifier may be unique within the wagering game.

The record 802 may also include a time of purchase 806. The time of purchase 806 field may store the time of purchase of the ticket associated with the record.

The record 802 may also include a draws 808. The draws 808 may identify the draws associated with the ticket. For example, each ticket may be associated with multiple draws. Thus, draws 808 may be a list of draw identifiers with which the ticket is associated with.

The record 802 may also include cards 810. For example, cards 810 may store the player cards associated with the ticket. Cards 810 may be a list of two card sets, each set associated with a draw in the wagering game. Cards 810 may store a plurality of two card sets because there may be a plurality of draws associated with the ticket.

The record 802 may also include place sold 812. The place sold 812 may be an identifier of the terminal that sold the ticket. The place sold 812 may be a numeric identifier. Another list in the wagering system may associate each place sold identifier with a textual description of the location.

The record 802 may also include auth code 814. For example, auth code 814 may store the authorization code associated with each ticket. The authorization code may be a check sum or other security feature used to verify the ticket upon redemption. For example, the authorization code may be a sequence of numeric or alpha-numeric characters.

The record 802 may also include rules selected 816. For example, rules selected 816 may store the wagering option associated with the ticket. In one example embodiment, two wagering options are possible: win against one opponent and win against all three opponents. The wagering option may affect the award provided to the player if the player holds a winning set of cards.

The record 802 may also include time redeemed 818. For example, time redeemed 818 may store the time at which the ticket was redeemed by the player for his prize. The time redeemed field may be left blank if a ticket is not associated with a winning set of cards, and thus is never redeemed.

The record 802 may also include a prize awarded 820. For example, the prize awarded 820 may store the prize that was awarded to the player when the ticket was redeemed. The prize awarded field may be left blank if a ticket is not associated with a winning set of cards, and thus is never redeemed. The prize awarded may be determined by looking up a prize records as depicted in FIG. 7.

FIG. 9A illustrates an example embodiment of a draw records, according to an example embodiment of the present invention. Each draw or draw in the wagering game may be stored in draw records 900. The draw records 900 may include a plurality of records 902, each record 902 representing one draw or draw in the wagering game.

It will be appreciated that the draw records 900 may be stored in a variety of ways. For example, it may be stored as a tab delimited or comma delimited flat file, in a relational database or another storage method accessible to a lottery host. The draw records 900 may be used for accounting, auditing, or fraud-detection purposes. For example, the draw records 900 may be used to audit past draws in the wagering game for regulatory purposes.

FIG. 9B illustrates an example embodiment of a draw records entry, according to an example embodiment of the present invention. Each draw records entry may be a record 902. Each record 902 may contain a variety of information, such as a Draw ID 904. Each draw in the wagering game may be associated with a Draw ID 904. The identifier may be an alpha-numeric sequence of characters. The identifier may be unique within the wagering game.

The record 902 may also include an open time 906. The open time 906 may store when the draw opened and tickets were available for players to purchase.

The record 902 may also include a close time 908. The close time 908 may store when the draw closed and tickets were no longer available for players to purchase. After the close time, the community cards and the opponent cards may be displayed, and players may collect their awards if they held winning player cards.

The record 902 may also include a draw time 910. The draw time 910 may store when the system drew the removed cards as described in FIGS. 1A and 1B. Community cards, opponent cards and burn cards may be selected from the removed cards at the close time.

The record 902 may also include cards pulled 912. The cards pulled 912 may store the removed cards removed from the virtual deck at draw time 910 as described in FIGS. 1A and 1B. Cards pulled 912 may be a list of the removed cards. For example, cards pulled 912 may be implemented as a linked list, an array, or another data structure.

The record 902 may also include community cards 914. Community cards 914 may store the community cards used in the draw. Community cards 914 may be implemented similarly to cards pulled 912.

The record 902 may also include opponent 1 cards 916 and opponent 2 cards 918. These fields may store the opponent cards used in the draw. For example, the records 902 may include a field for each opponent implemented in the wagering game. Opponent card fields may be implemented similarly to cards pulled 912.

The record 902 may also include burn cards 920. Burn cards 920 may store the burn cards used in the draw. Burn cards 920 may be implemented similarly to cards pulled 912.

FIG. 10 illustrates a second example screen shot of a display, according to an example embodiment of the present invention. The display may be broadcasted from the server to all displays as depicted in FIG. 2. For example, the display may be a screen mounted in a premise. Alternatively, the display may be a window or an area on a screen of a personal computer or wireless device.

The display may include a representation of burn cards 830. For example, the game may include two burn cards which are not revealed. The display may include a representation of community cards 832. For example, the game may include five community cards. The display may include a representation of opponent cards 834, 836 and 838. Each set of opponent cards may include two cards. The game may include three opponents. Alternatively, the game may include any number of opponents.

For example, a draw in the wagering game may first begin with displaying a screen as depicted in FIG. 4. The draw may then open, and players are given a period of time during which tickets may be purchased. After the draw closes, the system may display a screen as depicted in FIG. 10. From the screen, a player may determine whether his player cards are winning cards or not. If the player holds winning cards, he may redeem them for his award.

Modifications

In the preceding specification, the present invention has been described with reference to specific example embodiments thereof. It will, however, be evident that various modifications and changes may be made thereunto without departing from the broader spirit and scope of the present invention as set forth in the claims that follow. For example, any multiple player game may be converted to a table game format. The specification and drawings are accordingly to be regarded in an illustrative rather than restrictive sense.

The invention claimed is:

1. A system for facilitating play of a game of chance by multiple players at multiple locations using a virtual card deck, the system comprising:
- a plurality of terminals at the multiple locations, the terminals receiving wagers from the plurality of players, the plurality of terminals issuing tickets to the plurality of players, each ticket including a respective player hand chosen from the virtual card deck and an identification code uniquely identifying the ticket;
- a plurality of displays at the multiple locations, the displays displaying a shared community hand chosen from the virtual card deck; and
- a server in communication with the plurality of terminals and the plurality of displays,
  - the server configured to select a set of removed cards from the virtual card deck prior to issuance of tickets for the game,
  - the server configured to receive an indication of each player's wager from a terminal and configured to responsively provide a respective unique identification number and a respective player hand for inclusion on the ticket delivered to the player, each player hand chosen from the virtual card deck but not from the set of removed cards,
  - the server is configured to reset the virtual card deck after selecting cards for a player hand so that subsequent player cards for other players may be duplicates of the player cards chosen for the player hand,
  - the server configured to select the shared community hand from the set of removed cards and configured to communicate the shared community hand to the plurality of displays for display, and
  - the server configured to determine if a ticket is a winning ticket in accordance with predetermined game rules, based on the player hand included on the ticket and the shared community hand.

2. The system of claim 1, wherein the ticket is a printed ticket.

3. The system of claim 1, wherein the ticket is an electronic ticket.

4. The system of claim 1, wherein two different players receive the same player hand in separate entries in the same play of the game.

5. The system of claim 1, wherein the server is also configured to select at least one fictitious opponent hand from the removed cards and to communicate the fictitious opponent hand to the plurality of displays for display, and wherein determining if a ticket is a winning ticket is also based on the fictitious opponent hand.

6. The system of claim 5, wherein a ticket is a winning ticket if the player hand combined with the shared community cards is a better poker hand than the at least one fictitious opponent hand combined with the shared community cards.

7. The system of claim 5, wherein an award awarded for the winning hand depends on the type of poker hand that is obtained when the player hand is combined with the shared community cards.

8. The system of claim 1, wherein,
- the game includes multiple draws;
- each issued ticket includes an indication of the draws for which the ticket is issued and player hands for each of said indicated draws;
- the plurality of displays are configured to display shared community hands for each draw;

for each draw, the server is configured to remove a set of removed cards for the draw from the virtual card deck for that draw, to provide player hands for the draw for tickets that include that draw, the player hands chosen from the virtual card deck for that draw after the removed cards for that draw have been removed, the server configured to select the shared community hand for the draw from the set of removed cards for that draw and to communicate the shared community hand to the plurality of displays; and for each draw that is included on a ticket, the server is configured to determine if the ticket is a winning ticket in accordance with the predetermined games rules, based on the player hand included on the ticket for that draw and the shared community hand for that draw.

9. The system of claim 8, wherein, the server is configured to remove the set of removed cards of a draw before the server receives an indication of any player's wager.

10. A method for conducting a wagering game with a virtual deck of cards, comprising:

removing a set of removed cards from a virtual card deck;

displaying, on a video display, a set of community cards, chosen from the set of removed cards without replacement;

displaying, on the video display, a first set of opponent cards, chosen from the set of removed cards without replacement;

receiving, at a terminal, an input indicating a player's desire to participate in the wagering game;

choosing a first set of player cards, the first set of player cards being chosen from the virtual card deck but not from the set of removed cards;

resetting the virtual card deck after choosing the first set of player cards so that subsequent player cards for other players may be duplicates of the player cards chosen for the player hand;

determining if the first set of player cards are a winning set of cards based on the set of community cards, the first set of opponent cards and pre-determined rules; and providing an award to the player if the first set of player cards is the winning set of cards.

11. A method of claim 10, further comprising:

removing a set of burn cards from the deck of cards prior to selecting the first set of player cards.

12. A method of claim 10, further comprising:

receiving payment from the player.

13. A method of claim 10, wherein the deck of cards is a standard 52-card poker deck.

14. A method of claim 10, wherein the deck of cards includes wild cards.

15. A method of claim 10, wherein the award is selected from a prize table based on the pre-determined rules and is based in part on the first set of player cards, the community cards and the first set of opponent cards.

16. A method of claim 10, wherein the indication is received from a terminal and the award is provided at the terminal.

17. A method of claim 10, wherein the first set of player cards is displayed to the player on a printed ticket.

18. A method of claim 10, further comprising:

randomly selecting the set of community cards, the first set of opponent cards and the first set of player cards from the deck of cards without replacement prior to displaying the first set of player cards.

19. A method of claim 10, further comprising:

receiving an input indicating a player's desire to participate in a second hand in the wagering game;

displaying a second set of player cards from the deck of cards, chosen from the virtual card deck but not from the set of removed cards;

determining if the second set of player cards are a winning set cards of based on pre-determined rules; and providing an award to the player if the second set of player cards is the winning set of cards.

20. A method of claim 10, further comprising:

displaying a second set of opponent cards from the deck of cards, wherein the second set of opponent cards are selected from the deck of cards prior to selecting the first set of player cards.

21. A method of claim 10, further comprising:

receiving an input indicating a second player's desire to participate in the wagering game;

displaying a set of second player cards from the deck of cards, chosen from the virtual card deck but not from the set of removed cards;

determining if the set of second player cards are a winning set cards of based on pre-determined rules; and providing an award to the second player if the set of second player cards is the winning set of cards.

22. A method of claim 10, wherein the pre-determined rules include evaluating a player's hand including at least one card from the first set of player cards and at least one card from the set of community cards.

23. A system for conducting a wagering game with a virtual deck of cards, comprising:

a network;

a first terminal including, a first input device configured to receive an indication of a first player's desire to participate in the wagering game, and a first ticket dispenser configured to dispense a ticket displaying a first player's set of cards;

a second terminal including, a second input device configured to receive an indication of a second player's desire to participate in the wagering game, and a second ticket dispenser configured to dispense a ticket displaying a second player's set of cards;

a display configured to, display a set of community cards, display a set of opponent cards, and display a winning set of cards based on pre-determined rules; and a server in communication with the first terminal and the second terminal via the network, the server configured to, receive the indication of the first player's desire to participate in the wagering game from the first terminal through the network interface, receive the indication of the second player's desire to participate in the wagering game from the second terminal through the network interface, select the set of community cards and the set of opponent cards from a set of cards removed from the deck of cards without replacement, select the first player's set of cards and reset the deck of cards after selecting the first player's set of cards so that player cards for the second player may be duplicates of the player cards chosen for the first player, select the second player's set of cards from the reset deck of cards, and communicate the set of community cards and the set of opponent cards to the display.

24. A system of claim 23, wherein the server further includes a prize table.

25. A system of claim 23, wherein the set of community cards, the set of opponent cards, the first player's set of cards and the second set of player cards are selected randomly.

26. A system of claim 23, wherein the display is further configured to display a set of burn cards, and the processor is further configured to select the set of burn cards from the deck of cards without replacement before selecting the first player's set of cards and the second set of player cards.

27. A computer readable medium including instructions adapted to execute a method for conducting a wagering game with a virtual deck of cards, the method comprising:

removing a set of removed cards from a virtual card deck;

displaying, on a video display, a set of community cards, chosen from the set of removed cards without replacement;

displaying, on the video display, a first set of opponent cards, chosen from the set of removed cards without replacement;

receiving an input indicating a player's desire to participate in the wagering game;

choosing a first set of player cards, the first set of player cards being chosen from the virtual card deck but not from the set of removed cards;

resetting the virtual card deck after choosing the first set of player cards so that subsequent player cards for other players may include duplicates of the cards in the first set of player cards, determining if the first set of player cards are a winning set of cards based on the set of community cards, the first set of opponent cards and pre-determined rules; and providing an award to the player if the first set of player cards is the winning set of cards.

28. The system of claim 1, wherein the server is configured to delay communicating the shared community hand to the plurality of displays until a close time has elapsed.

29. The method of claim 10, further comprising:

delaying the display of the first set of player cards until a close time has elapsed.

30. The system of claim 23, wherein the server is configured to delay communicating the set of community cards to the display until a close time has elapsed.

* * * * *